(12) United States Patent
Laimer et al.

(10) Patent No.: US 6,326,581 B1
(45) Date of Patent: Dec. 4, 2001

(54) TORCH FOR CUTTING PROCESSES

(75) Inventors: Johann Laimer, Baden; Herbert Störi, Vienna; Heribert Pauser, Grafenwörth, all of (AT)

(73) Assignee: Fronius Schweissmaschinen Produktion GmbH & Co. KG, Pettenbach (AT)

( * ) Notice: Subject to any disclaimer, the term of this patent is extended or adjusted under 35 U.S.C. 154(b) by 0 days.

(21) Appl. No.: 09/600,693

(22) PCT Filed: Jan. 22, 1999

(86) PCT No.: PCT/AT99/00017

§ 371 Date: Aug. 18, 2000

§ 102(e) Date: Aug. 18, 2000

(87) PCT Pub. No.: WO99/38365

PCT Pub. Date: Jul. 29, 1999

(30) Foreign Application Priority Data

Jan. 23, 1998 (AT) .................................................... 133/98

(51) Int. Cl.[7] .................................................. B23K 10/00
(52) U.S. Cl. ............................. 219/121.39; 219/121.44; 219/121.49; 219/121.48; 219/75; 219/121.51
(58) Field of Search .................. 219/121.36, 121.51, 219/121.48, 121.39, 121.49, 121.44, 121.52; 313/231.31, 231.41

(56) References Cited

U.S. PATENT DOCUMENTS

| 3,534,388 | 10/1970 | Ito et al. . |
|---|---|---|
| 3,567,898 | 3/1971 | Fein . |
| 3,619,549 | 11/1971 | Hogan . |
| 4,339,546 | * 7/1982 | Randalls ................. 518/714 |
| 4,589,488 | * 5/1986 | Schirmer ................. 166/270 |
| 4,902,871 | 2/1990 | Sanders et al. . |
| 5,560,844 | 10/1996 | Boulos et al. . |
| 5,609,777 | 3/1997 | Apunevich et al. . |

FOREIGN PATENT DOCUMENTS

| 1 964 816 | 7/1970 | (DE) . |
|---|---|---|
| 0 640 426 | 5/1997 | (EP) . |
| 2 657 489 | 7/1991 | (FR) . |
| 930 436 | 7/1963 | (GB) . |
| 02 205 270 | 8/1990 | (JP) . |
| 2 060 128 | 5/1996 | (RU) . |

* cited by examiner

*Primary Examiner*—Mark Paschall
(74) *Attorney, Agent, or Firm*—Collard & Roe, P.C.

(57) ABSTRACT

The invention relates to a blow torch (6) for a cutting process, in particular a steam cutting process, comprising a control device (3), a liquid supply system, in particular a container (5) for a liquid (8), and a power source (2), the blow torch (6) being connected via lines (9, 10) to the power source (2). The blow torch (6) is connected by a supply line (7) to the liquid supply system. At least one duct or flow passage for the liquid (8) having a predeterminable cross section and path is provided in the blow torch (6) and is designed to convert the liquid (8) into a gaseous state, in particular a gas (19).

36 Claims, 10 Drawing Sheets

TORCH FOR CUTTING PROCESSES

The invention relates to a blow torch for cutting a workpiece and a method for cutting with the blow torch.

A blow torch for a steam-cutting process is known from JP 02 205 270 A and comprises a control device, a liquid supply system and a power source, the blow torch being connected to the power source by lines. The blow torch is connected to the liquid supply system by a supply line. A flow passage provided in the blow torch is designed so that the liquid is converted into a geas or steam during operation. The flow torch has a cathode and an anode. A line connects the liquid supply system to the intermediate cavity between the cathode and the anode.

EP 0 60 425 B1 discloses a blow torch for a cutting process, in particular a steam-cutting process, in which a container for the liquid, in particular water, is provided in the blow torch. The blow torch has an anode separated from a cathode by an intermediate cavity, an arc being struck between the anode and cathode. In order to ignite the arc, energy is supplied to the blow torch from a power source arranged in a supply unit and pressure is applied by the user in order to push the cathode against the anode so that the arc is ignited when the cathode is moved back from the anode into the non-operating position of the cathode. To enable the fluid to penetrate the intermediate cavity between the anode and the cathode, the container is filled with a porous, heat-conducting material which is joined to a ring sealing off the intermediate cavity so that the fluid, or a gas generated when the fluid is heated, is able to flow from the container into the intermediate cavity through connecting passages in the ring. As a result of the arc ignited in the intermediate cavity, the fluid is transformed from its liquid state into a gaseous state and simultaneously heated, enabling the gas, in particular water vapor, to flow out of the blow torch at high temperature. The disadvantage of this system is that because the container is arranged in the flow torch, the structural dimensions are limited in order to make the blow torch as flexible as possible to manipulate, which means that the container can hold only a small quantity of liquid, making a more lengthy cutting process impossible.

The underlying object of the invention is to provide a blow torch for a cutting process and a method of operating it, capable of achieving a long running time for a cutting process whilst affording the blow torch a high degree of flexibility.

According to one aspect of this invention, this object is accomplished with a blow torch for cutting a workpiece, which comprises a liquid supply system connected to the blow torch by a liquid supply line, a cathode, and an anode, an intermediate cavity being provided between an end of the cathode and the anode. A flow passage surrounds the cathode and has one end arranged to receive liquid from the liquid supply line and an opposite end leading to the intermediate cavity, and a heating element is mounted on the blow torch and controlled to deliver a predetermined amount of heat. The flow passage has a predetermined cross section and is so dimensioned that the predetermined amount of heat completely evaporates the liquid and converts the liquid to a gaseous state in the intermediate cavity.

This offers an advantage due to the fact that no liquid is able to penetrate the intermediate cavity between anode and cathode, which prevents the arc from being extinguished.

A further advantage is that the predetermined path and/or cross section of the duct or flow passage in the blow torch ensures that the liquid is converted into the gaseous state as it leaves the duct or flow passage. Another advantage resides in the fact that by connecting the blow torch to an external liquid supply system, the user is able to run a cutting process without being subjected to a time limit. Yet another advantage is the fact that by arranging the liquid supply system externally, the flow torch can be constructed in a simpler design.

According to another aspect of the invention, there is provided a method of cutting a workpiece with a blow torch comprising a cathode and an anode, which comprises the step of supplying a liquid under pressure to a flow passage surrounding the cathode and having one end arranged to receive the liquid from a liquid supply line and an opposite end leading to an intermediate cavity provided between an end of the cathode and the anode. The liquid flowing through the flow passage is heated, the heating is controlled to deliver a predetermined amount of heat and the quantity of liquid is so controlled that the predetermined amount of heat completely evaporates the liquid and converts the liquid to a gaseous state in the intermediate cavity. An arc is ignited between the anode and cathode.

Various advantageous embodiments are described hereinafter and illustrated in the attached drawings.

DETAILED DESCRIPTION OF DRAWINGS

Figure 1:
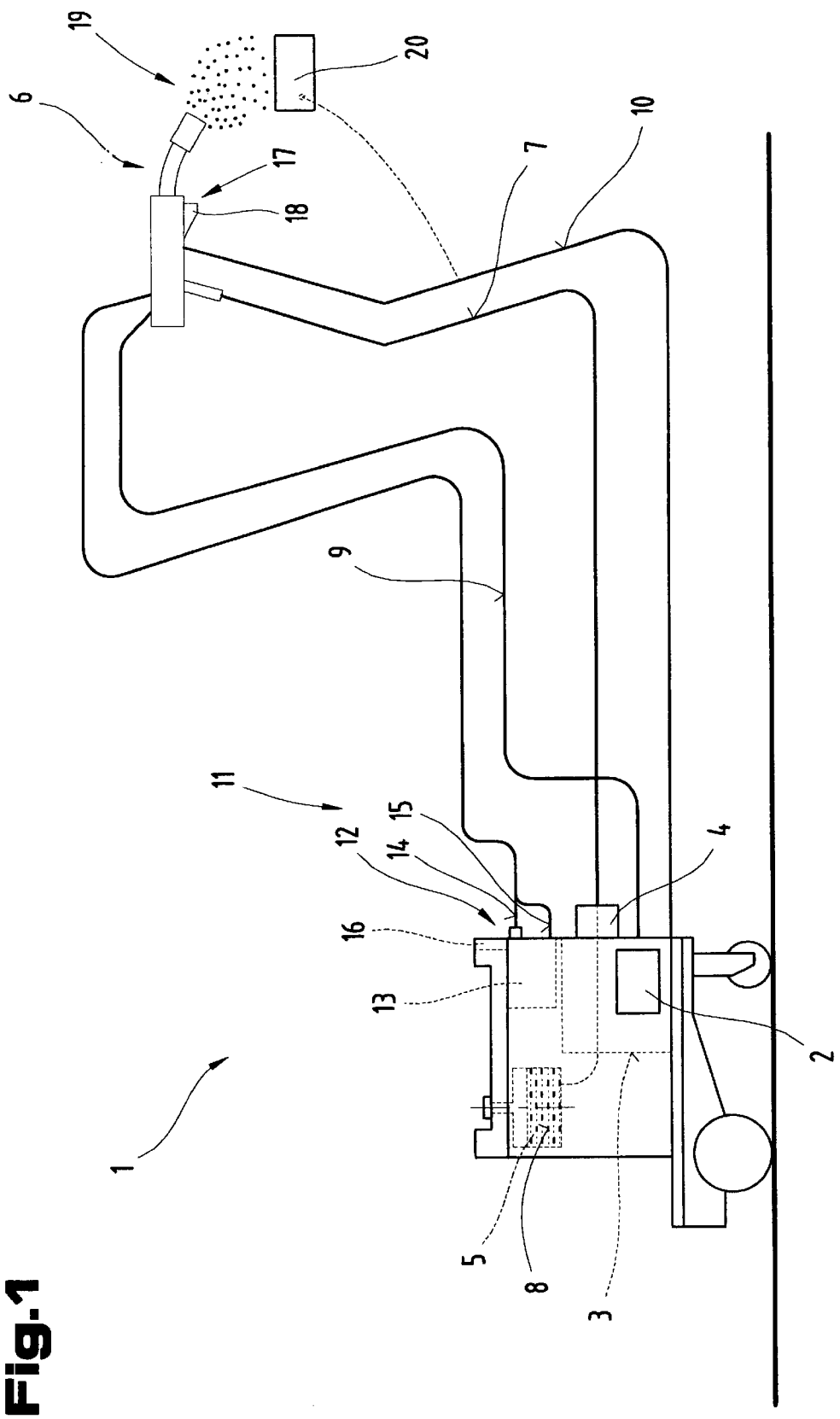
FIG. 1 is a schematic illustration of the structure of the steam cutting device.

Firstly, it should be pointed out that in the descriptions of the embodiments, the same parts are denoted by the same reference numbers and the same component names and the disclosures contained in the description as a whole can be transposed in therms of meaning to the same components with the same reference numbers and same component names. Details of the selected positions given in the descriptions, such as top, bottom, side, etc., relate to the embodiment actually being described and illustrated in the drawings and, when a different position is being described, can be transposed in terms of meaning to the new position described. Furthermore, individual features described in relation to the illustrated embodiments may be regarded as independent solutions to the invention in their own right.

FIG. 1 illustrates a supply unit 1 for a steam cutting process. The supply unit 1 comprises a power source 2, a control device 3 and a closure member 4 co-operating with the control unit. The closure member 4 is connected to a container 5 and a blow torch 6 by means of a supply line 7 so that a liquid 8 held in the container 5 can be fed to the blow torch 6 by means of the supply line 7.

The blow torch 6 is supplied with energy, in particular current and voltage, via lines 9, 10 from the power source 2.

In order to cool the blow torch 6, the blow torch 6 is connected to a liquid container 13 by means of a cooling circuit 11 via an intermediately connected flow indicator 12, by means of which the cooling circuit 11 can be activated from the control device 3 when the blow torch 6 or the supply unit 1 are switched on so that the blow torch 6 can be cooled by means of the cooling circuit 11. To this end, the blow torch 6 is connected to the liquid container 13 by means of coolant lines 14, 15.

The supply unit 1 also has an input and/or display device 16, by means of which the most varied of parameters or operating modes can be set for the supply unit 1. The parameters set from the input and/or display device 16 are forwarded to the control device 3, enabling the control device 3 to operate the individual components of the supply unit 1.

Clearly, it would also be possible, as in the embodiment illustrated, for the blow torch 6 to be connected to the supply unit 1 by means of the individual lines illustrated although the individual lines would be bundled in a hose pack and connected to the blow torch 6 and the supply unit 1 by means of connector plugs.

The blow torch 6 may also have at least one operating element 17, in particular a button 18. From the operating element 17, in particular the button 18, the user can communicate with the control device 3 of the blow torch 6 to initiate and run a steam cutting process.

To this end, once the button 18 has been operated, the control device 3 will activate the individual components needed for the steam cutting process, i.e. the control device 3 firstly activates the closure member 4 and the power source 2 so that the blow torch 6 is supplied with liquid 8 and energy. The control device 3 then activates the cooling circuit 11 so that the blow torch can be cooled. When the blow torch 6 is supplied with liquid and with power, in particular current and voltage, the liquid 8 in the blow torch 6 is converted into a gas 19 at high temperature so that the gas 19 flowing out from the blow torch 6 can be applied to a workpiece 20 in order to run a cutting process.

Figure 2:
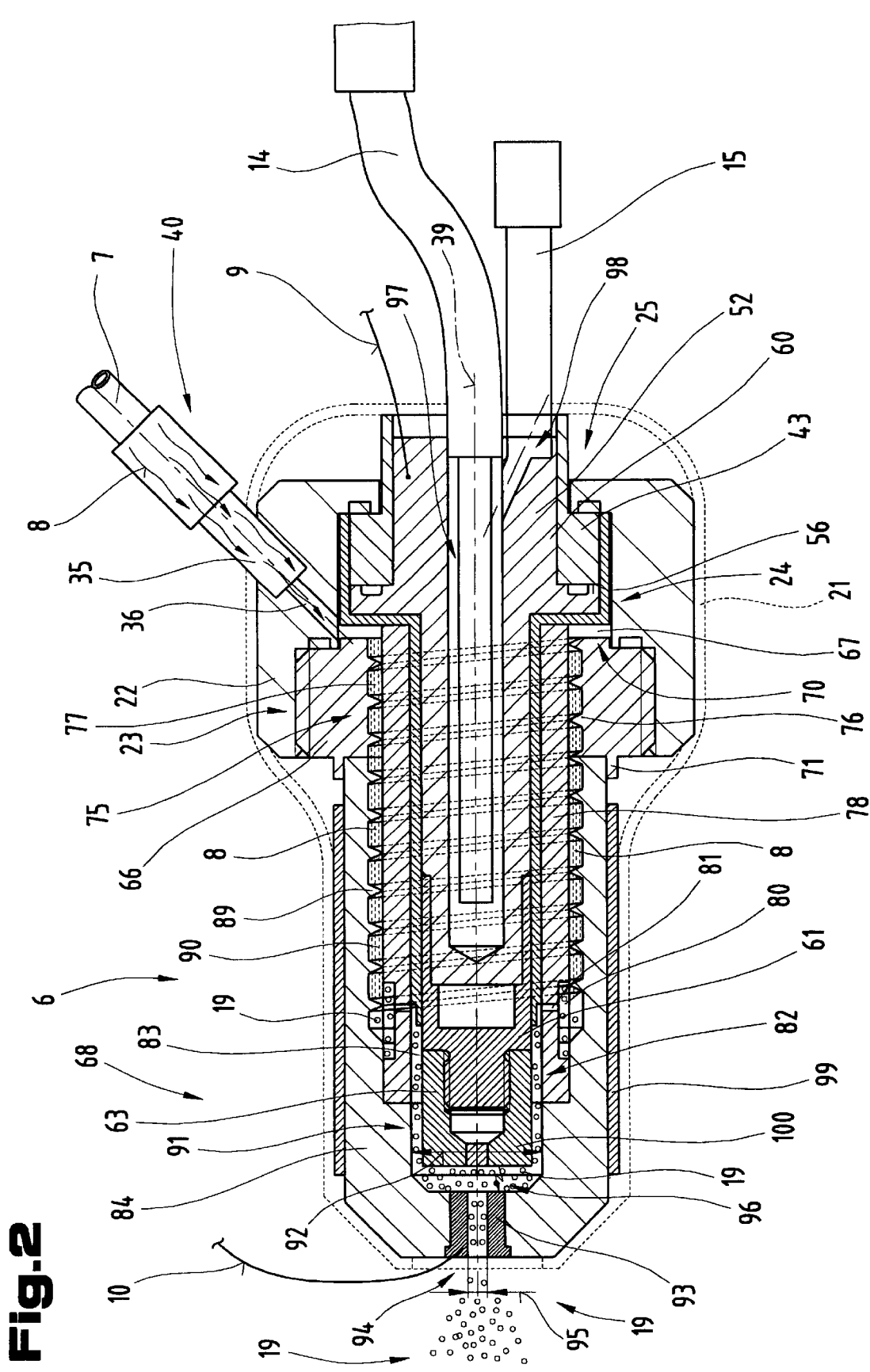
FIG. 2 is a detailed illustration of a blow torch as proposed by the invention, seen in section from a side view in a simplified schematic diagram.
Figure 3:
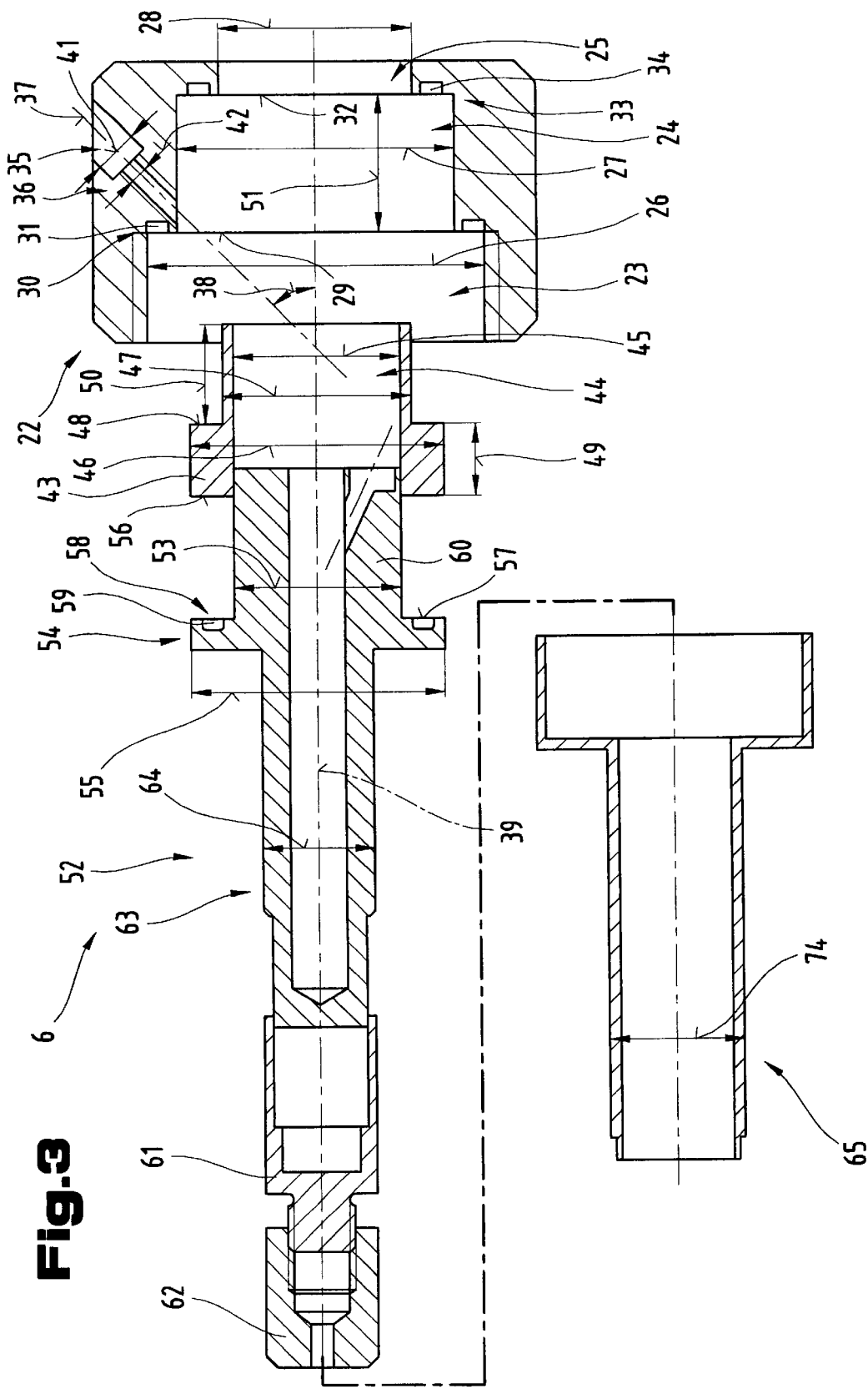
FIG. 3 is an exploded view of the components of the blow torch proposed by the invention and illustrated in FIG. 2.
Figure 4:
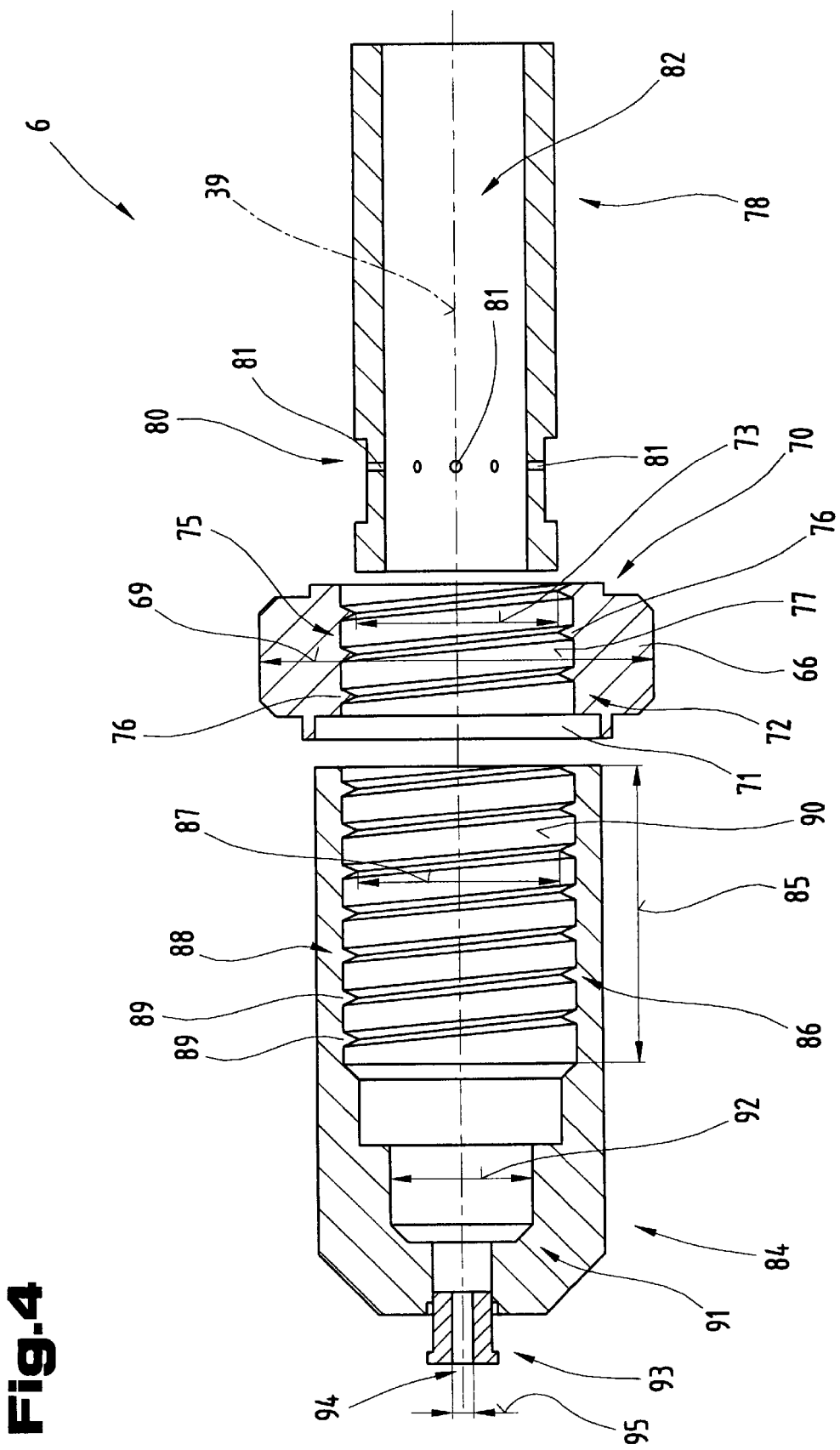
FIG. 4 is another exploded diagram showing the other components of the blow torch proposed by the invention and illustrated in FIG. 2.

FIGS. 2 to 4 provide a detailed illustration of the blow torch 6, seen in section from a side view, and an exploded diagram of the individual components of the blow torch 6. In the embodiment illustrated, the individual connecting lines to the supply unit 1 are shown in schematic form only.

The blow torch 6 is preferably an assembly of individual, rounded components, the individual components of the blow torch 6 being housed in a protective housing 21, which is shown in schematic form in the drawing. The protective housing 21 is preferably a plastic casing so that the user will not be subjected to an electric shock from the individual current-carrying components if he touches the protective housing 21.

The blow torch 6 has a housing piece 22, in which three bores 23 to 25 of different diameters 26 to 28 are provided.

In the transition region between the bore 23 to the bore 24, a sealing groove 30 can be provided in an end face 29 and a seal 31 placed therein. Clearly, it would also be possible to provide another sealing groove 33 in the other transition region between the bore 24 and the bore 25, in other words in an end face 32, in which another seal 34 could be placed.

The housing piece 22 also has another two bores 35, 36. The two bores 35, 36 are arranged concentrically with the middle axis 37 extending in the middle of the two bores 35, 36. The middle axis 37 may be arranged at an angle 38 to a longitudinal central axis 39 extending in a longitudinal direction of the blow torch 6, for example,. The bore 36 opens into the bore 24 so that an outlet or inlet is provided from the bore 24 via the two bores 35, 36.

Due to the layout of the two bores 35, 36, a connecting piece 40 for the supply line 7 can now be placed in the bore 35. For this purpose, the bore 35 has a larger diameter 41 than a diameter 42 of the bore 36. The connecting piece 40 may be screwed into the bore 35 by means of a thread, for example. The blow torch 6 can be connected via the supply line 7 to the supply unit 1 by means of the connecting piece 40. Any coupling device known from the prior art may be used to connect the connecting piece 40 to the supply line 7. Clearly, instead of providing the two bores 35, 36 with different diameters 41, 42, it would also be possible to provide a single bore 35 or 36, namely the bore 35, in which case the connecting piece 40 would be arranged in the bore 35.

The bores 35, 36 are preferably arranged in the transition region between the bore 23 and the ore 24, in other words in the region of the end face 29, so that the outlet of the bore 36 opens into the bore 24 in the transition region.

Other components of the blow torch 6 are connected to the housing piece 22. To this end, an insulating element 43, preferably made from a non-conductive material, is inserted or secured in the bore 24. The insulating element 43 is designed so that a bore 44 with a diameter 45 matching the diameter 28 of the bore 25 of the housing piece 22 is arranged in a longitudinal direction relative to the longitudinal central axis 39 of the blow torch 6. Furthermore, the insulating element 43 has two different external diameters 46, 47 providing an end face 48 in the transition region between the two external diameters 46, 47 of the insulating element 43. The insulating element 43 is positioned in the housing piece 22 so that it is inserted in the bore 25 of the housing piece 22 by its external diameter 47 and extends from the bore 24 through or into the bore 25. To this end, the external diameter 47 matches the diameter 28 of the bore 25, so that when the insulating element 43 is inserted, the bores 23, 24 provide a positioning or guiding function for the insulating element 43 by means of the bore 25. In addition, the seal 34 provides a sealed closure between the end face 32 of the bore 24 and the end face 48 of the insulating element 43 in the transition region.

The two differing external diameters 46, 47 of the insulating element 43 provide a stepped design, the region of the insulating element 43 which has the external diameter 46 being of a length 49 and the other region a length 50. The length 49 is smaller than the length 51 of the bore 24, i.e. when the insulating element 43 is inserted, it does not extend across the entire length 51 of the bore 24 and instead, the insulating element extends over only a partial region of the bore 24, leaving a free cavity in the bore 24 for other components of the blow torch 6. In the embodiment illustrated, the dimensions of a length 50 for the region of the external diameter 47 of the insulating element 43 are otherwise selected so that when the insulating element 43 is inserted in the bore 24, the region of the insulating element 43 having the external diameter 47 projects out beyond the bore 25.

Another component of the blow torch 6 is positioned or inserted in the insulating element 43, namely a cathode tube 52, i.e. the cathode tube 52 has an external diameter 53 in the region of the insulating element 43 matching the diameter 45 of the bore 44, allowing the cathode tube 52 to be accurately positioned and guided in the insulating element 43. For this purpose, the cathode tube 52 may be provided with a projection 54 having an external diameter 55 so that as the cathode tube 52 is inserted, it can be accurately position against an external face 56 of the insulating element 43. The external diameter 55 of the projection 54 matches the external diameter 46 of the insulating element 43 so that the projection 54 is sealed in a straight line with the insulating element 43.

For this purpose, a sealing groove 58 may be provided in an end face 57 of the projection 54, co-operating with the region of the cathode tube 52 having the external diameter 53 and a seal 59 placed in the sealing groove 58, in which case the two components, in particular the cathode tube 52 and the insulating element 43, will form a tight closure as a result of the seal 59.

As far as the design of the cathode tube 52 is concerned, it may consist of several parts 60, 61, 62, for example, which are assembled with one another by threads. For this purpose, the part 60 of the cathode tube 52 is inserted in the insulating element 43, as in the embodiment illustrated in the drawing.

The cathode tube 52, in particular the part 60, has, on the projection 54, a longitudinal region 63 in the direction opposite the region of the cathode tube 52 which has the external diameter 53, on which the other parts 61, 62 are arranged. The longitudinal region 63 has an external diameter 64 which is smaller than the external diameter 53 of the region arranged before the projection 54 so that the cross section is duly reduced after the projection 54.

The other parts 61, 62 of the cathode tube 52 may be of any design, although care should be taken to ensure that the external diameter 64 is not made any bigger by the individual parts 61, 62. To this end, the individual parts 60 to 62 are designed in such a way that a taper is provided in the transition region between each of the individual parts 60 to 62 so that the additional parts 60 to 62 can be screwed onto this tapered section. Accordingly, threads may be provided in the transition region between the individual parts 60 to 62 to provide a means of fitting these parts 60 to 62.

Designing the cathode tube 52 in several individual parts 60 to 62 has an advantage in that different materials can be used to make the cathode tube 52. For example, the part 62 may be made of copper and a hafnium insert or a zirconium insert may be arranged in the middle of part 62. The advantage of using a hafnium insert or a zirconium insert is that the insert can be heated more quickly and to a higher temperature so that when the arc is ignited between the anode and the cathode, the arc will mainly extend from the hafnium insert or the zirconium insert to the anode. The other part 61 may be made from steel, for example, in which case there will be only a slight dispersion of heat to the part 60, i.e. if the cathode tube 52 is made from different materials, the heat given off from the cathode tube 52 can be selectively controlled. The part 60 may be made from any material, in particular copper. Controlling the heat given off means that a correspondingly high proportion of heat can be maintained in the part 62, thereby enabling a corresponding heating process by means of the cathode tube. The individual parts 60 to 62 are made from electrically conductive materials and when one of the parts 60 to 62, in particular part 60, is connected to the line 9, the energy applied can flow across the individual parts 60 to 62 into the end region of the cathode tube 52.

Providing the insulating element 43 means that the cathode tube 52 is insulated from the housing piece 22 and the other components. Since the external diameter 46 of the insulating element 43 and the external diameter 55 of the projection 54 are smaller than the diameter 27 of the bore 24 of the housing piece 22, an air gap is formed between the housing piece 22 and the projection 54 as well as the insulating element 43 and an insulating tube 65 can be inserted in the air gap, in particular over the cathode tube 52 and the insulating element 43, so that the projection 54 is insulated from the housing piece 22 by means of the insulating tube 65.

For this purpose, the insulating tube 65 is made from a non-conductive material, The insulating tube 65 may be of any shape formed by the two individual components, namely the insulating element 43 and the cathode 52, in the region of the housing piece 22 and in the assembled state. Clearly, it would also be possible for a thread to be provided in the connecting region between the projection 54 and the insulating element 43 as well as the insulating tube 65, in which case the insulating tube 65 can be screwed onto the two components.

If the blow torch 6 is provided as individual components, in particular the insulating tube 65, the cathode tube 52 and the insulating element 43, care should be taken to ensure that when the housing piece 22 is placed in the bore 24 it does not extend across the entire length 51 of the bore 24, so that a passage 67 formed between the insulating tube 65 and a bridging piece 66 inserted in or screwed into the bore 23. By providing the passage 67 between the insulating tube 65 and the bridging piece 66 and aligning the opening of the bore 36 with the passage 67, the liquid 8 is able to flow via the supply line 7 through the bores 35, 36 and into the passage 67.

In the longitudinal region 63 of the cathode tube 52, the insulating tube 65 extends across a partial region of the total length of the cathode tube 52 so that the cathode tube 52 is left exposed and is not insulated from the other components in the end region 68 of the blow torch 6.

The bridging piece 66 inserted in the bore 23 is designed so that its external diameter 69 matches the diameter 26 of the bore 23. To this end, it is of advantage if a thread is provided on the contact surfaces between the bridging piece 66 and the bore 23 so that the bridging piece 66 can be screwed into the bore 23. In addition, the bridging piece 66 has a projection 70. The projection 70 protrudes into the bore 24 of the housing piece 22 causing the passage 67 to taper. The advantage of this is that the design of the projection 70 allows the width and cross section of the passage 67 to be modified, i.e. if the projection 70 is of a larger design, the passage will be tapered so that less liquid 8 is able to flow through the bore 36 into the passage 67, thereby increasing the flow rate of the liquid 8. Another advantage gained by the design of the projection 70 is that the quantity of liquid 8 flowing through the blow torch 6 can be adjusted. To this end, the bridging piece 66 with the projection 70 merely has to be changed to provide a rapid adjustment of the through-flow quantity or the flow rate of the liquid 8 to the width and cross section of the passage 67. In the direction opposing that of the projection 70, the bridging piece 66 has another projection 71. This projection 71 is used to connect additional components of the blow torch 6 to the bridging piece 66 in the projection 71 or guided by the projection 71.

The bridging piece 66 has a bore 72 extending in a longitudinal direction of the longitudinal central axis 39 of the blow torch 6. The bore 72 has a diameter 73 which is larger than the external diameter 74 of the insulating tube 65 in the longitudinal region 63 of the cathode tube 52, so that an air gap is formed accordingly between the insulating tube 65 and the bridging piece 66.

A thread 75 is provided in the bore 72 of the bridging piece 66. The thread 75 has a pitch of between 1 mm and 10 mm, for example, preferably 3 to 6 mm. Providing the thread 75 means that a guide passage 77 is provided for the liquid 8 between the individual threads 76.

The guide passage 77 is made possible because the intermediate cavity or air gap between the insulating tube 65 and the thread 75, in particular the set of threads 76, is filled by another element, namely a sleeve 78, which is placed over the insulating tube 65, so that the threads 76 duly form the guide passage 77.

Designing the bridging piece 66 so that a thread 75 or guide passage 77 is provided in the bore 72 has another advantage in that a connection is provided between the threads 76 and the passage 67 through the guide passage 77 so that when the liquid 8 penetrates the passage 67, the liquid 8 is fed across the guide passage 77 through the threads 76.

Clearly, it may be that no thread 75 is provided in the bore 72, in which case an air gap or a passage will be formed between the bridging piece 66 and the sleeve 78 and will still form a guide passage 77 so that the liquid 8 will be fed along.

In the end region 68 of the blow torch 6, the sleeve 78 has a circumferential groove 80. The groove 80 also has bores 81 running through it, arranged radially to the longitudinal central axis 39 of the blow torch 6, so that the groove 80 links up with a bore 82 provided in the sleeve 78. The groove 80 is arranged in the region in which the insulating tube 65 terminates when the cathode tube 52 is covered, i.e. the bores 81 open in the region in which the cathode tube 52 lies exposed to the other components of the blow torch 6 and is no longer screened by the insulating tube 65 so as to be electrically isolated from the exterior. To this end, the bores 81 running radially around the longitudinal central axis 39 are designed so that they open into the intermediate cavity 83 between the end of the insulating tube 65 and the exposed cathode tube 52.

The end of the insulating tube 65 may be of any design. Care must be taken to ensure that an outlet can be provided from the bore 81 into the intermediate cavity 83. Accordingly, the insulating tube 65 may be of a stepped design in the end region 68 of the blow torch 6.

An evaporator unit 84 is also placed over the sleeve 78. The evaporator unit 84 has a bore 86 across a length 85, having a diameter 87. A thread 88 is provided in the bore 86 across the length 85. The thread 88 has a pitch of between 1 mm and 10 mm, for example, preferably 3 mm to 6 mm. Because of the individual threads 89 of the thread 88, a flow passage 90 is formed between the individual threads 89. The diameter 87 of the bore 86 of the evaporator unit 84 is of the same size as the diameter 73 of the bore 72 in the bridging piece 66 providing a flush transition from the guide passage 77 of the bridging piece 66 to the flow passage 90 of the evaporator unit 84.

By designing the evaporator unit 84 in this manner, the liquid 8 is able to flow into the passage 67 from the supply line 7 via the bores 35, 36, after which the liquid 8 can flow via the guide passage 77 and in front of the flow passage 90 as far as the groove 80 of the sleeve 78. The liquid 8 therefore flows in a spiral arrangement, in particular at a tangent in a longitudinal direction about the longitudinal central axis 39 through the individual threads 76, 89 of the bridging piece 86 and the evaporator unit 84. From the groove 80, the liquid 8 or the gas 19 generated in the evaporator unit 84 is able to flow through the bores 81 arranged radially to the longitudinal central axis 39 into the intermediate cavity 83 between the sleeve 78 and the cathode tube 52.

Because of the design of the groove 80 in the direction of the evaporator unit 84, the liquid 8 or the gas 19 generated in the evaporator unit 84 is evenly distributed around the groove 80 so that the gas 19 flows evenly through the bores 81 into the intermediate cavity 83.

It should be pointed out that because of the defined or predetermined flow passage 90 formed by the thread 88 in the embodiment illustrated here, the gas 19 is distributed evenly at a tangent around the longitudinal central axis 39 of the blow torch 6 so that as the gas 19 enters the intermediate cavity 83, it is not affected by the position of the blow torch 6 or the gravitational field of the earth, i.e. the gravitational field of the earth can not affect the individual media or liquids 8 or gases 19 in the blow torch 6 because the liquid 8 is delivered to the blow torch 6 under pressure and, because the liquid 8 is compressed and because pressure is also generated as the liquid 8 is then converted to a gas 19 and applied to the media, in particular the liquid 8 and the gas 19 in the interior of the blow torch, there is no need to take special account of the position of the blow torch 6 when using the blow torch.

In the end region 68 of the blow torch 6, the evaporator unit 84 is designed so that the intermediate cavity 83 preferably extends around the cathode tube 52, preferably along the same distance. Accordingly, the evaporator unit 84 has another bore 91 of a smaller diameter 92.

So that the liquid 8 is able to flow out and escape from inside the blow torch 6 to the exterior, in particular the open air, an anode 93 may be placed in the end region 68 of the blow torch 6 in the form of an inserted component in the evaporator unit 84. Running in the longitudinal direction of the longitudinal central axis 39, the anode 93 has a bore 94 with a diameter 95. The anode 93 is preferably made from a good, electrically conductive material and the anode 93 may be pushed or screwed into the evaporator unit 84. Clearly, this could also be provided in a single piece with the evaporator unit 84 made from a good, electrically conductive material, in which case the bore 94 would be arranged in the evaporator unit 84 and the inserted component dispensed with, the entire evaporator unit 84 forming the anode 93.

In order to supply the blow torch 6 with current and voltage, the individual components needed to conduct the current are connected via lines 9, 10 to the supply unit 1, i.e. the anode 93—as schematically illustrated—is connected to line 10 whilst the cathode tube 52 is connected to the supply unit 1 by means of line 9. Accordingly, the negative potential is fed across the cathode tube 52 whilst the positive potential is applied to the anode 93 so that the arc can be ignited between the cathode tube 52 and the anode 93, closing the power circuit.

To enable the blow torch 6 described with reference to FIG. 1 to be cooled by means of the cooling circuit 18, for example, coolant lines 14, 15 are provided in each of the bores 97, 98 in the cathode tube 52, so that a cooling circuit 11 can be set up inside the blow torch 6 by feeding in coolant. In order to cool the blow torch 6 in the embodiment illustrated here, an insert in the form of a pipe can be placed in the bore 97 of the cathode tube 52, the pipe being joined to the coolant line 14 in a water-tight connection. The pipe has an opening in the end region so that the coolant liquid can be fed across the coolant line 14 and out of the pipe and flow back to the coolant line 15 through the bores 97, 98, so that the coolant circuit 11 is connected via the coolant lines 14, 15 to the supply unit 1. Clearly, the blow torch 6 need not necessarily have a cooling circuit 11 of this type. This being the case, the blow torch 6 would be cooled exclusively by means of the compressed liquid 8 flowing via the bores 35, 36, the passage 67, the guide passage 77 and the flow passage 90 into the blow torch 6, after which it would flow in gaseous form from the flow passage 90 via the intermediate cavity 83 and the bore 94 into the atmosphere. The heat would then be fed away solely by means of the compressed liquid 8 and the gas 19, i.e. the liquid 8 and the gas 19 flows through the ducts or flow passages of the blow torch 6, thereby cooling the blow torch 6.

Obviously, the design and layout of the individual components are not necessarily restricted to those of the embodiment described here. Furthermore, the embodiment of the blow torch 6 given here as an example or the associated components could also be constructed in a single piece, the blow torch 6 being determined by the functions required of the individual component units or components. Care should be taken to ensure that the cathode tube 52, in particular the conductive parts 60 to 62, are arranged so as to be isolated from the components arranged on the exterior around the cathode tube 52, in particular the anode 93, so that current is prevented from reaching the end region 68 of the blow torch 6.

As may be seen from the embodiment illustrated, the individual components of the blow torch 6 may be incorporated—as explained above—in the common protective housing 21, which may be made from a plastics material for example, indicated in the drawing by a broken line. Accordingly, the protective housing 21 may be made up of several parts which can connected to one another by snap-fit connections or screw fittings.

So that the liquid 8 can be converted from the liquid state into the gaseous state, a heating element 99 may be provided on the external surfaces of the evaporator unit 84. The heating element 99 is supplied with current and voltage from the supply unit 1 for this purpose, thereby heating the evaporator unit 84 and with it the liquid 8 flowing in the flow passage 90.

To enable the user to run a steam cutting process, the blow torch 6 needs to be supplied with energy, in particular current and voltage, from the supply unit 1 and at the same time as the blow torch 6 is supplied with current and voltage, liquid 8, in particular water, is also delivered to the blow torch 6. The blow torch 6 is supplied with liquid 8 exclusively under pressure, i.e. the liquid 8 is delivered to the blow torch 6 at a requisite pressure, in particular between 1 bar and 10 bar, preferably 3 bar to 6 bar, so that the liquid 8 is fed under pressure and is compressed in the passages provided in the blow torch 6.

To enable the liquid 8 to be pressurised in the blow torch 6, a pumping device may be provided in the supply unit 1, for example, to deliver the liquid 8 under pressure to the blow torch 6, or any other delivery means known from the prior art capable of delivering the liquid 8 via the supply line 7 under pressure.

Clearly, instead of using a device to deliver the liquid 8, it would also be possible to place the container 5 under pressure thereby ensuring that the liquid 8 would automatically be pressurised in the blow torch 6. It would also be possible, for example, to connect the container 5 or the blow torch 6 directly or the supply line 7 by means of the supply unit 1 to a pressurised water line, although care would need to be taken to ensure that the pressure in the water line was high enough to convey the liquid 8 automatically and independently to the blow torch 6. With embodiments of this type, in which the liquid 8 is delivered to the supply unit 1 and the blow torch 6 under pressure, it is of advantage to provide a pressure-regulating valve in the supply unit 1 or in the blow torch 6 so that the pressure can be regulated from the control device 3. If, on the other hand, a pressure-regulating device is used such as a pumping system or a pump, the pressure of the liquid 8 can be controlled by means of the pumping rate. This control would in turn be managed from the control device 3.

In the embodiment illustrated here, the supply unit 1 has a pumping device, for example, which delivers the liquid 8 under pressure from the supply unit 1 to the blow torch 6. When the supply device 1 is switched on, the blow torch 6 is supplied with liquid 8 from the container 5 via the supply line 7. Simultaneously, energy is applied to the blow torch 6 from the power source 2, i.e. energy is applied to the cathode tube 52 and the anode 93 so that a power circuit can be set up across the blow torch 6 by igniting the arc 96.

In order to be able to ignite the arc 96 in the blow torch 6 between the cathode tube 52, in particular between a cathode 100 arranged before the anode 93 and the anode 93, the supply unit 1 may be provided with a high-frequency generator in order to emit high-frequency signals. The control device 3 will then activate the high-frequency generator so that a high-frequency signal is overlaid on the energy supply to supply the blow torch 6. By overlaying or modulating a high frequency signal onto the energy supply of the blow torch 6, an arc 96 can be ignited because of the distance or intermediate cavity 83 between the cathode 100 and the anode 93. The ignition process or overlaying of the high-frequency signal on the energy supply is already known form welding technology and may also be used for a steam cutting process of this type.

The arc 96 is therefore ignited in the region of the cathode 100, in other words in the end region of the cathode tube 52. The arc 96 therefore builds up at any point of the exposed cathode tube 52 and the evaporator unit 84 across the intermediate cavity 83, i.e. the arc 96 is struck by an arc-over from the part 62 to the evaporator unit 84 producing a flow of current across the blow torch 6. If energy needs to be supplied to the blow torch 6 for a longer period, the arc 96 will wander because of the flow of gas 19 into the region of the anode 93 towards the front and the arc 96 will be maintained in the region of the bore 94 running in the longitudinal direction of the longitudinal central axis 39 from which the gas 19 flows out. Since the cathode 100 is designed with a hafnium insert or a zirconium insert or other inserts, the hafnium insert or the zirconium insert will be heated to a higher degree than the other material used for the cathode 100, in particular copper, so that as the arc 96 moves forward into the region of the hafnium insert or zirconium insert, the arc 96 will pass over the hafnium insert or zirconium insert and will then remain on it due to the higher level of heat in the hafnium insert or zirconium insert and will be maintained as a result.

However, in order to be able to ignite the arc 96, the liquid 8 delivered from the supply unit 1 to the blow torch 6 is converted from its liquid state into the gaseous state to form the gas 19 the prior to igniting the arc 96. The advantage of this is that it is easier to ignite the arc 96 between the cathode 100 and the anode 93. To this end, the liquid 8 is delivered under pressure from the supply unit 1 via the supply line 7 to the blow torch 6 and is then heated by the heating element 99 until transition from the liquid state into the gaseous state in the evaporator unit 84. For this purpose, the liquid 8 is fed through the bores 35, 36 into the passage 67 of the blow torch 6. The liquid 8 then flows through the thread 75, 88 of the bridging piece 66 and the evaporator unit 84 into the region of the cathode 100, i.e. the liquid 8 flows from the passage 67 via the guide passage 77 and the flow passage 90 formed by the individual threads 76 and 89, in the direction of the circumferential groove 80. In the region of the evaporator unit 84, the heating element 99 applies energy to the liquid 8 in the flow passage 90 until it is transformed from the liquid state into the gaseous state before reaching the circumferential groove 80 so that the gas 19 can flow through the flow passage 90, the circumferential groove 80 and the bores 81 arranged radially to the longitudinal central axis 39 into the intermediate cavity 83. From there, the gas 19 flows around the cathode 100 and around the cathode tube 52 to the bore 94 of the anode 93, from where the gas 19 can flow out from the blow torch 6.

Before the arc 96 is ignited, there are various possible methods of evaporating the liquid 8. For example, before delivering the liquid 8 to the blow torch 6, the control device 3 can actuate the heating element 99 which will heat the evaporator unit 84 to an appropriate temperature so that after a time which can be pre-set from the control device 3, the pumping device in the supply unit 1 is switched on in order to deliver the liquid 8 to the blow torch 6 under pressure. By pre-heating the blow torch 6, when the liquid 8 is pushed into the blow torch 6, particularly into the passages, it has already been heated to an appropriate temperature and the liquid 8 will be heated to an appropriate temperature as a result, causing the liquid 8 to evaporate and turning the liquid 8 into a gas 19 in the passages. However, since the liquid 8 is delivered under pressure, the individual passages in the blow torch 6 are also kept at a corresponding pressure, predetermining a flow direction for the liquid 8 and the gas 19 in the interior of the blow torch 6. As a result, the gas 19 flows from the flow passage 90 through the grooves 80 into the intermediate cavity 83 and, after the pre-set period has elapsed, the arc 96 is ignited when the control device 3 activates the high-frequency generator. Once the arc 96 is ignited, the gas 19 is further heated or ionised across the arc 96 so that the gas 19 is able to leave the blow torch 6 at a higher temperature. At the same time, because the liquid 8 is delivered under pressure and because the gas 19 flows out under pressure, the arc 96, which is ignited at any point between the anode 93 or evaporator unit 84 and the cathode 100 or cathode tube 52 wanders due to the flow of gas 19 in the direction of the bore 94. Consequently, the blow torch 6 is heated by the arc 96 more intensely in the end region 68, ensuring that the gas 19 flows out at a correspondingly high temperature.

Once the arc 96 has been duly ignited and the individual components of the blow torch 6 have heated due to the ignited arc and the heat generated as a result, the heating element 99 is switched off by the control device 3 so that the heating element 99 ceases applying heat to the blow torch 6. The liquid 8 in the interior of the evaporator unit 84, in particular in the flow passage 90, is now vaporised due to the fact that the heat given off by the arc 96 in the interior of the blow torch 6, heats the adjacent components, in particular the evaporator unit 84, retaining them at an appropriate temperature and the liquid 8 will automatically be evaporated. However, to prevent the blow torch 6 from becoming overheated due to the heat given off by the arc 96, the control device 3 may now switch on the cooling circuit 11 or, if using a welding torch 6 which does not have a cooling circuit 11, cooling will be effected by increasing the quantity of liquid 8, i.e. as the liquid 8 is fed through the individual passages, sufficient heat is picked up from the components by the liquid 8 to keep the temperature of the blow torch 6 constant.

Another option for generating the gas 19 prior to igniting the arc 96 is for the control device 3 to activate the pumping device before the arc 96 is ignited and before energy is applied to the anode 93 and the cathode 100 so that the liquid 8 is delivered to the blow torch 6 under pressure. The liquid 8 then flows under pressure through the individual flow passages so that the liquid 8 enters the intermediate cavity 83 and escapes to the atmosphere via the bore 84. Simultaneously, and after a certain period has elapsed, the control device 3 activates the heating element 99 so that the liquid 8 is heated by the heat from the evaporator unit 84 as it flows past, causing the liquid 8 to evaporate. Once the liquid 8 has been transformed into the gas 19 in the blow torch 6, the control device 3 switches on the power source 2 so that it supplies energy to the anode 93 and cathode 100. The control device 3 activates the high-frequency generator at the same time so that the overlaid high-frequency pulse initiates an ignition in the intermediate cavity 83 between the anode 93 or the evaporator unit 84 and the cathode 100. Once the arc 96 has been ignited, the individual components are heated again by the arc 96 so that after a predeterminable period has elapsed and the individual components have been duly heated, the control device 3 can switch the heating element 99 off and the liquid 8 will automatically evaporate in the evaporator unit 84.

By designing the guide passage 77 and the flow passage 90 in the form of a thread 75, 88, the compressed liquid 8 is forced or guided in a specified manner by the individual threads 76, 89 so that the liquid 8 flows at a tangent around the sleeve 78. This lengthens the heating path in the region of the evaporator unit 84, ensuring that the liquid 8 is transformed into the gaseous state. Another advantage of the design of the flow passage 90 is that the blow torch 6 can be used in any position, i.e. the liquid 8 will continue to be conveyed uniformly regardless of the position of the blow torch 6, guaranteeing that the liquid 8 will be converted from its liquid state into the gaseous state. In addition, because the liquid 8 is delivered under pressure, a pressure also builds and this pressure is maintained in the individual ducts or flow passages of the blow torch 6 so that the user will always have a supply of gas 19 flowing out through the bore 94 in the end region 68 of the blow torch 6. Clearly, it would also be possible to provide the individual ducts or flow passages, such as the guide passage 77 and the flow passage 90, with a double thread. Instead of having the thread 75, 88, the guide passages 77 and the flow passage 90 could be provided with simple longitudinal slits or grooves in the evaporator unit 84. The guide passage 77 and the flow passage 90 could also conceivably be provided in the form of a circumferential groove around the sleeve 78.

As the gas 19 now flows from the bore 94 out of the anode 93 and out of the evaporator unit 84 and once the arc 96 has been ignited in the interior of the blow torch 6, the gas 19 is heated to a correspondingly high temperature as a result of the heat duly given off by the arc 96 so that a steam cutting process can be run, i.e. the gas 19 leaves the anode 93 and the evaporator unit 84 at a very high temperature, the high temperature of the gas 19 enabling the operator of the blow torch 6 to run a cutting process, of the type known from the prior art, such as a plasma cutting process for example.

There are significant advantages to be had if a blow torch 6 for a cutting process of this design is used for cutting or welding the workpiece 20. It is not necessary—as is the case with a conventional cutting process—for the workpiece 20 to be connected to a potential of the power supply, it being sufficient for the arc 96 to be ignited inside the blow torch 6, which means that no energy and no potential has to be applied to the workpiece 20, i.e. the workpiece 20 is free of potential and the power circuit inside the blow torch 6 is closed.

In order to be able to regulate the pressure and meter the liquid 8 delivered to the blow torch 6, a pumping device is provided in the supply unit 1, for example, i.e. if a higher quantity of liquid is needed, more energy can be applied to the pumping device for example, so that the rate of the pumping device can be increased and the pressure in the supply line 7 raised accordingly, thereby delivering more liquid 8 to the blow torch 6 and compressing it in the passage 67. The user can enter a setting to regulate the liquid 8 from the supply unit 1. This being the case, a setting can be entered so that the liquid 8 is delivered to the blow torch 6 at a pressure between 1 bar and 10 bar, preferably between 3 bar and 6 bar. Furthermore, if using a pressurised container instead of the container 5, or if the supply line 7 is connected to a pressurised feed line for a liquid 8, a pressure-regulating valve may be provided so that the control device 3 can control the pressure by means of the pressure-regulating valve.

Because the gas 19 is heated to a high temperature in the blow torch 6 due to ignition of the arc 96, the temperature of the individual components in the blow torch 6 increases accordingly. During longer cutting processes, this can occur to such a degree that the user is no longer able to hold the blow torch 6 in his hands because the blow torch 6 is duly heated to a high temperature by the gas 19. In order to avoid this situation, the control device 3 may switch on the cooling circuit 18, i.e. a coolant liquid, in particular water, is pumped through the coolant lines 14, 15 to the blow torch 6 so that a coolant circuit 18 can be set up inside the blow torch 6 by means of the bores 97, 98 arranged in the cathode tube 52. The cooling circuit may be based on any method known from the prior art used for cooling a blow torch 6 or from the closely related field of welding technology used to cool a welding torch.

Provided the individual components and delivery of the liquid 8 are dimensioned and specified accordingly, the cooling circuit 11 can be dispensed with and the blow torch 6 cooled by the liquid 8 or the air around the blow torch 6. Clearly, it would also be possible to operate the cooling circuit 11 intermittently, i.e. the coolant circuit 11 would not be activated unless the temperature of the blow torch 6 rose above a pre-settable temperature value. The temperature of the blow torch 6 may be monitored by a temperature-dependent component connected to the control device 3 and the cooling circuit 11 switched on and switched off by the control device 3 on the basis of a comparison with a pre-settable desired temperature. To this end, a pressure sensor could be provided to monitor delivery of the liquid 8 to the blow torch 6 and regulated accordingly if the pressure of the liquid 8 falls, in particular by increasing the pressure, or delivery of the liquid 8 could be interrupted and the energy supply via the lines 9, 10 to the blow torch 6 switched off simultaneously.

In order to control the temperature at a defined level so as to maintain the arc 96 at the cathode tube 52, the cathode tube 52, comprising parts 60 to 62, may be made of different materials so that the heat can be selectively directed across the individual parts 60 to 62. The advantage of using a cathode tube 52 of this design is that the dispersion of heat from the cathode 100, in particular the part 62, can be kept low so that the part 62 will remain at a specific temperature accordingly, thereby maintaining the arc 96, i.e. by keeping heat dispersion from the part 62 to the part 60 low, the part 62 will be heated to a correspondingly high temperature by the heat given off from the arc 96, so that a stable arc 96 can be struck between the anode 93 and the cathode 100. Because the heat dispersed from the cathode 100 in the direction of the part 60 is low, the surrounding components such as the evaporator unit 84 and the intermediate cavity 83 can be heated to a corresponding temperature or maintained at a constant level.

With a blow torch 6 of this design and with the guide passage 77 and the flow passage 90 of a tangential or spiral-shaped layout about an axis, in particular about the longitudinal central axis 39 of the blow torch 6, the liquid 8 can be uniformly vaporised in the evaporator unit 84, leading to a uniform flow of gas 19 to the bore 94, thereby preventing any interruption in the arc 96. Another advantage of designing the ducts or flow passages in this manner, in particular the guide passage 77 and the flow passage 90, having ridges, grooves, recesses, etc., resides in the fact that boiler residues occurring as the liquid 8 is evaporated can be mechanically removed by the user, affording the blow torch 6 a long service life.

Clearly, in the blow torch 6 illustrated here, the individual flow passages, in particular the passage 67, the guide passage 77 or the flow passage 90, could be provided with a device designed to modify the cross section of the flow passage so that the flow rate of the liquid 8 or the gas 19 inside the blow torch 6 can be modified. To this end, a ring system could be provided by means of which the user would turn the ring from the exterior in order to reduce a cross section.

The blow torch 6, in particular the quantity of liquid or the quantity of energy supplied, can be regulated by the user from the supply unit 1. For this purpose, the quantity of liquid could be regulated in proportion to the quantity of energy from the control device 3, i.e. by simply adjusting the energy supply of the blow torch 6, for example, in particular the current level, from the control device 3, the associated liquid quantity could be calculated and the individual components used to deliver the liquid 8, in particular the pumping device in the embodiment illustrated here, controlled so as to assume the relevant values accordingly. Other means known from the prior art for regulating liquids 8 and energy could also be used, in particular current and voltage. For example, a temperature sensor may be provided in the blow torch 6 in order to monitor the temperature of the individual components or a specific component unit or the gas temperature or other components.

Figure 5:
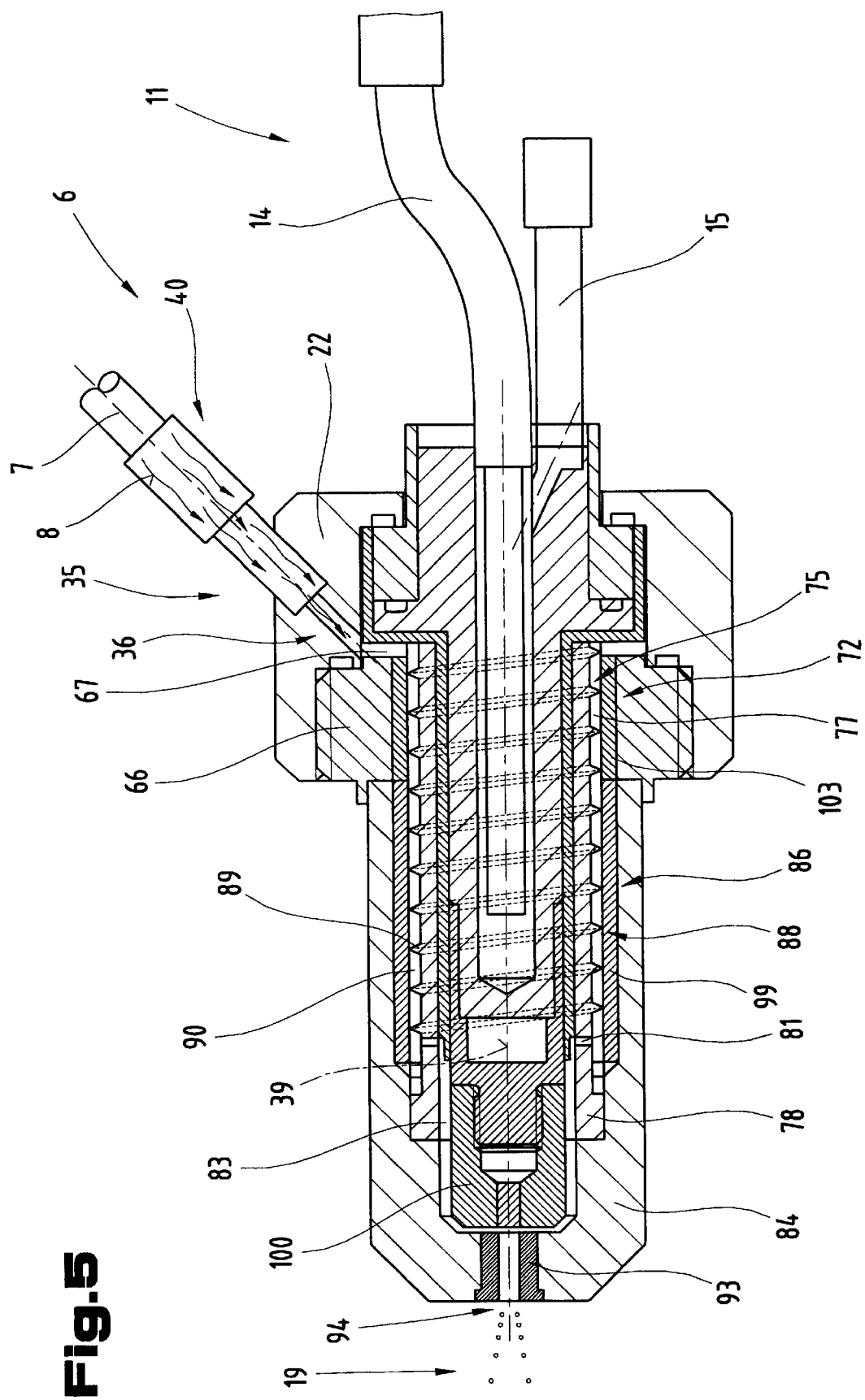
FIG. 5 is a simplified, schematic illustration of another embodiment of the blow torch proposed by the invention, seen in section from a side view.

FIG. 5 illustrates another embodiment of the blow torch 6 with its individual components, as described in FIGS. 2 to 4, the same reference numbers being used to denote the same components.

Here too, the blow torch 6 is supplied with pressurised liquid 8 from the container 5 of the supply unit 1 via the bores 35, 36 of the housing piece 22, after which the liquid 8 flows via the passage 67, the guide passage 77 and the flow passage 90 to the bores 81 running radially around the longitudinal central axis 39 of the sleeve 78 into the intermediate cavity 83. In the interior of the blow torch 6, in particular in the flow passage 90, the liquid 8 is converted into the gas 19. The gas 19 is able to escape via the anode 93, in particular through the bore 94 of the anode 93, from the interior of the blow torch 6 to the outside air.

This embodiment of the blow torch 6 differs from that illustrated in FIGS. 2 to 4 due to the fact that the thread 88 of the evaporator unit 84 is no longer provided on the evaporator unit 84 and instead the thread 88 used to form the flow passage 90 and the guide passage 77 is provided on the exterior surface of the sleeve 78, an external thread with threads 89 being provided on the sleeve 78. By providing a thread 88 with a pitch of from 1 mm to 10 mm, the flow passage 90 or the guide passage 77 for the liquid 8 is provided in the intermediate cavities between the individual threads 89.

However, in order form the requisite flow passage 90 or guide passage 77, the other components, in particular the evaporator unit 84 and the bridging piece 66, have a flat surface providing a closure with the thread 88 so that the two components placed over the thread 88 form an enclosure between the individual components, thereby forming the flow passage 90 or the guide passage 77, as described with reference to FIGS. 2 to 4.

Furthermore, the heating element 99 used to heat the liquid 8 is not arranged on the exterior surface of the evaporator unit 84 and instead, the heating element 99 is arranged in the interior of the bore 86 of the evaporator unit 84 so that the heating element 99 is in direct contact with the liquid 8. In addition, it is also possible to provide a heating element 103 in the bore 72 of the bridging piece 66 so that as the liquid 8 passes from the passage 67 into the guide passage 77, it is already heated by the heating element 103.

To this end, the heating elements 99, 103, may be electrically insulated from the other components in order to avoid any short-circuiting which might otherwise be caused by the liquid 8 flowing past or the gas 19 flowing past or between the current-carrying evaporator unit 84.

The blow torch 6 operates in the same manner as the blow torch 6 described with reference to FIGS. 2 to 4 above, i.e. the liquid 8 is transformed from its liquid state into its gaseous state in the evaporator unit 84 as the heating elements 99, 103 heat the liquid 8 to transform it from its liquid state into a gaseous state, forming the gas 19. The gas 19 then flows across the flow passage, in particular through the thread 88, in the direction of the bores 81 and then into the intermediate cavity 83 of the blow torch 6 via the bores 81 and the gas 19 is further heated by the arc 96 between the anode 93 and the cathode 100, so that as the gas 19 leaves the bore 94 of the anode 93, the user has a supply of hot enough gas 19 to run a cutting process. Other operating features with regard to control options can also be found in the description of FIGS. 2 to 4.

Figure 6:
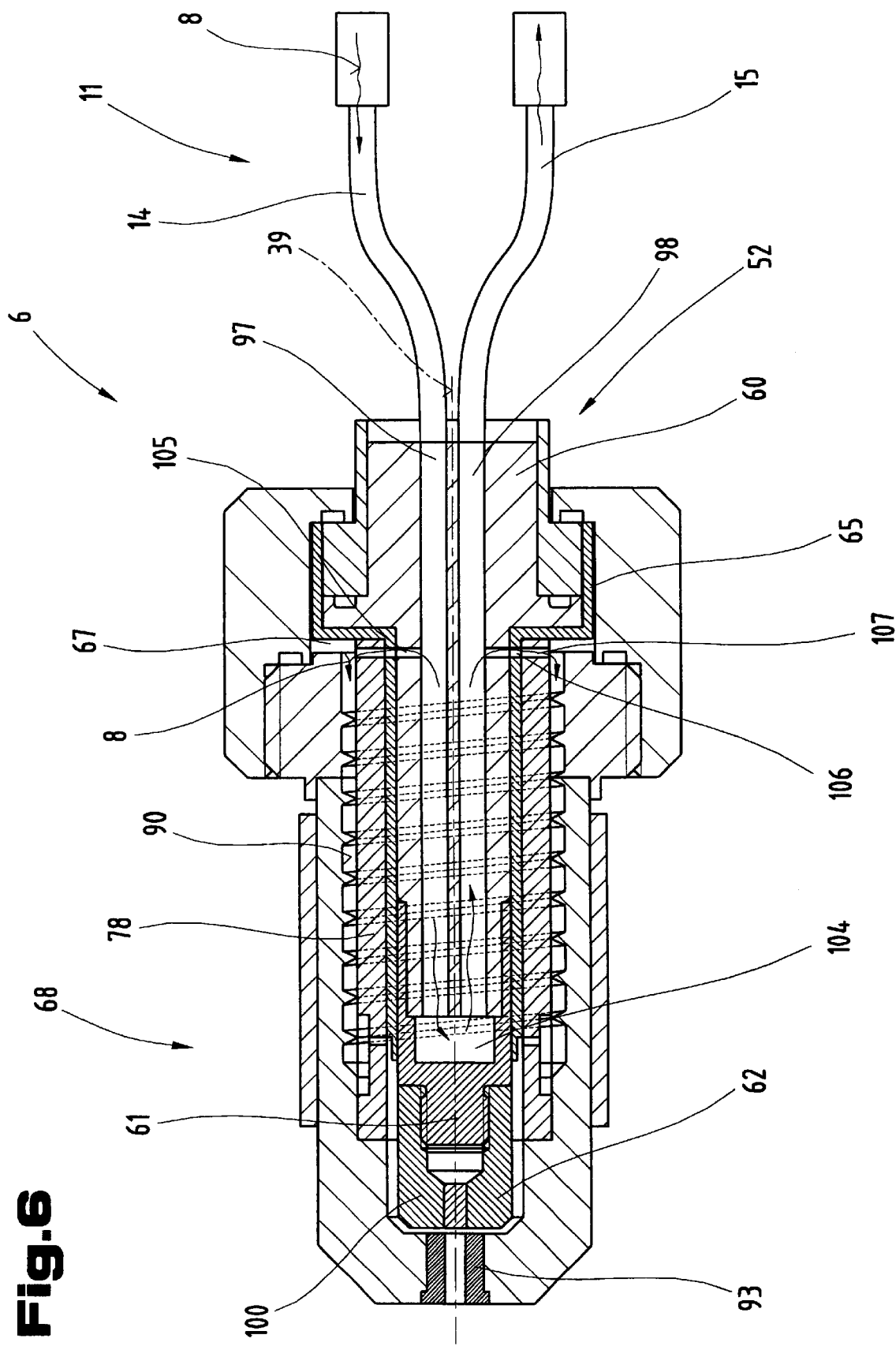
FIG. 6 is a simplified, schematic illustration of another embodiment of the blow torch proposed by the invention seen in section from a side view.

FIG. 6 illustrates another embodiment of the blow torch 6, the same reference numbers being used to denote the same components.

The difference of this embodiment from those described with reference to FIGS. 1 to 5 resides in the fact that the liquid 8 is not delivered separately through the supply line 7 and instead the supply of liquid 8 to the blow torch 6 is combined with the cooling circuit 11, i.e. liquid 8 is diverted from the cooling circuit 11, in particular from the coolant lines 14, 15 and the bores 97, 98.

A different structure of the cooling circuit 11, designed for this purpose, is illustrated here. The cooling circuit 11 is again provided in the cathode tube 52, the cathode tube 52 in this case being designed so that two bores 97, 98 are provided, running parallel with the longitudinal central axis 39. In the end region 68 of the blow torch 6, the cathode tube 52, which again comprises parts 60 to 62, has an intermediate cavity 104. The bores 97, 98 extend into the intermediate cavity 104, which is provided between parts 60 and 61 of the cathode tube 52 so that the coolant liquid or the liquid 8 can flow across the coolant line 14 and the bore 97 into the intermediate cavity 104 and then back to the supply unit 1 through the other bore 98, closing the cooling circuit 11.

In order to be able to divert the liquid 8 from the cooling circuit 11, the cathode tube 52 has bores 105 in the region of the passage 67, arranged radially around the longitudinal central axis 39, which open into the bores 97, 98 for the cooling circuit 11. To this end, bores 106, 107 are also provided in the insulating tube 65 and the sleeve 78, flush with the bore 105 of the cathode tube 52, allowing a flow of liquid 8 to pass into the guide passage 77 and into the passage 67. When the individual components of the blow torch 6 are assembled, a seal with a bore running through its centre may be provided across bores 105 to 107 to provide a sealed joint between the individual components, in particular the sleeve 78, the insulating tube 65 and the cathode tube 52, thereby preventing any leakage of liquid 8 between the individual components.

In the embodiment illustrated here, a separate control system may be used for the coolant lines 14, 15 so that the liquid 8 is fed through only one coolant line 14, 15, i.e. by providing a closure member 4 in each coolant line 14, 15, for example, in particular a valve, the control device 3 will open only one closure member 4 when the cooling circuit 11 is not needed so that the pump provided in the supply unit 1 will deliver the liquid 8 to the blow torch 6 through only one coolant line 14, for example, so that the liquid 8 can flow into the interior of the blow torch 6, in particular into the intermediate cavity 104, after which the liquid 8 will be able to flow through the bores 105 to 107 into the flow passage 90. This is possible because, since the liquid 8 is delivered under pressure, a corresponding pressure builds up in the blow torch 6 so that the liquid 8 is forced through the bores 105 to 107 into the passage 67 or into the flow passage 90, at which point the liquid 8 can be vaporised as described with reference to the preceding drawings.

If the dispersion of energy, in particular the dispersion of heat, via the liquid 8, in other words the outflow of gas 19 through the anode 93, is not sufficient, the control device 3 may shut off the cooling circuit 11 by activating the other closure member 4 for the coolant line 15 so that in addition to delivering liquid 8 into the flow passage 90, a cooling circuit 11 can be set up through the two bores 97, 98. Again, the cooling circuit 11 may be operated on an intermittent basis.

The blow torch 6 is operated in the same way as described with reference to the other drawings.

Another advantage of the embodiment described here is that cooling of the blow torch 6 is improved due to the design of the bores 97, 98 and the layout of the intermediate cavity 104 in the end region 68 of the blow torch 6 since the cooling length of the blow torch 6 can be lengthened accordingly, thereby drawing more heat off from the region of the arc 96. For this purpose, the cathode tube 52 may be made of two parts only so that the intermediate cavity 104 is arranged as close as possible to the anode 93, thereby producing an efficient dispersion of heat from the cathode 100 of the blow torch 6.

Another advantage provided by the design of the cooling circuit 11 and the intermediate cavity 104 is that when the cooling circuit 11 is not operating, the liquid 8 is pre-heated by the cathode 100 so that the liquid 8 can be vaporised more rapidly in the flow passage 90. This is possible when the other coolant line 15 is shut off and the liquid 8 is forced as far as the cathode 100 so that the liquid 8 is then returned through the other bore 98 and the liquid 8 in the intermediate cavity 104 is pre-heated by the cathode 100 to a corresponding temperature and only a lesser amount of heat need be applied in order to vaporise the liquid 8 as it enters the flow passage 90. For this purpose, a connection between the bore 97 and the flow passage 90 via the bores 105 to 107 can be dispensed with so that the liquid 8 is necessarily forced via the intermediate cavity 104 to the other bores 105 to 107, which connect with the bore 98 for the cooling circuit 11.

Figure 7:
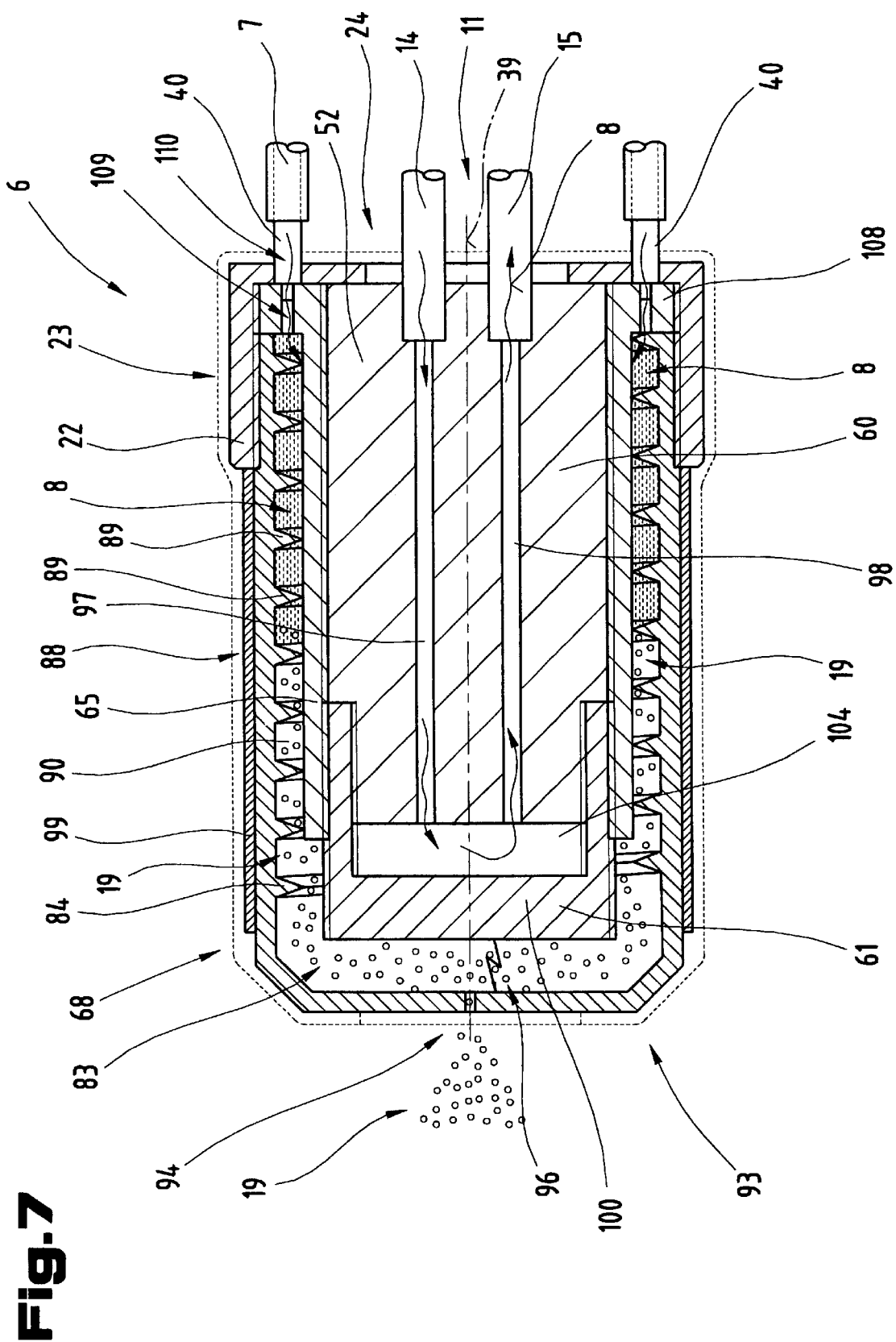
FIG. 7 is a simplified, schematic illustration of another embodiment of the blow torch proposed by the invention, seen in section from a side view.

FIG. 7 illustrates another embodiment of the blow torch 6, operation of the blow torch 6 being the same as that described with reference to FIGS. 1 to 6. In the embodiment described here, the individual components of the blow torch 6 are designed differently from those described above with reference to FIGS. 1 to 6, although the same parts or parts which perform the same function are shown by the same reference numbers.

The individual components of the blow torch 6 are the housing piece 22, the cathode tube 52, the insulating tube 65, the evaporator unit 84 and the heating element 99.

The housing piece 22 has two bores 23, 24, the individual components being connected to or positioned relative to one another by means of the bore 23. The purpose of the bore 24 is to provide a connection between the cathode tube 52 and the supply unit 1 via the coolant lines 14, 15, i.e. a through-passage is formed by the coolant lines 14, 15 for the cooling circuit 11 via the bore 24. Clearly, instead of the bore 24, it would also be possible to provide two bores assigned to the coolant lines 14, 15.

The coolant lines 14, 15 are connected to the cathode tube 52 in such a way that as it leaves and enters the coolant lines 14, 15, the liquid 8 is able to flow into the bores 97, 98 of the cathode tube 52. To this end, the cathode tube 52 is made up of two parts, i.e. the intermediate cavity 104 is formed in the end region 68 of the blow torch 6 between the parts 60 and 61 so that the liquid 8 can flow out of the bore 97 into the intermediate cavity 104. The liquid 8 then flows from the intermediate cavity 104 via the bore 98 into the coolant line 15, so that the cooling circuit 11 is closed. By arranging the intermediate cavity 104 as close as possible to the anode 93 and the arc 96, the cathode 100 can be very efficiently cooled in the region of the arc 96, thereby producing a correspondingly high dispersion of energy or dispersion of heat via the cooling circuit 11, preventing the blow torch 6 from overheating. Clearly, the blow torch 6 could also be cooled exclusively by the liquid 8 conveyed to the blow torch 6 under pressure.

The evaporator unit 84 again has a thread 88, the flow passage 90 being formed between the individual threads 89. In order to insulate the evaporator unit 84 from the cathode tube 52, the insulating tube 65 is provided between the evaporator unit 84 and the cathode tube 52. In the end region, it has a projection 108 by means of which the diameter of the insulating pipe 85 is adapted to the external diameter of the evaporator unit 84.

When assembling the individual components, the cathode tube 52 is firstly placed in the insulating tube 65. To this end, a thread may be provided in the transition region between the insulating tube 65 and the cathode tube 52, enabling the two components to be screwed together. The two parts, in particular the insulating tube 65, are then placed in or screwed into the bore 23 of the housing piece 22. Clearly the bore 23 could also be provided with a thread so that the insulating tube 65 can be screwed in at any time. The evaporator unit 84 is then inserted in or screwed into the bore 23 of the housing piece 22 by means of the insulating tube 65 so that the flow passage 90 is formed between the thread 88 and the insulating tube 65.

So that the liquid 8 can be delivered from the supply unit 1 to the flow passage 90, the insulating tube 65 and the housing piece 22 each have a bore 109, 110 in the connecting region to the supply line 7 so that when the bore 110 is connected to the supply line 7, for example by a matching connecting piece 40, the flow passage 90 can be supplied with liquid 8. Clearly, additional bores 109, 110 could also be provided around the longitudinal central axis 39 in order to supply the flow passage 90 with liquid 8. To this end, the individual connecting pieces 40 could be arranged to merge together in a common supply line 7 or the individual bores 110 could be connected to the supply unit 1 by means of additional lines.

The heating element 99 is arranged at the external periphery of the evaporator unit 84, as described with reference to FIGS. 2 to 4, in order to heat the liquid 8 before igniting the arc 96 in the flow passage 90. Due to this layout of the heating element 99, when energy is applied to the heating element 99, the evaporator unit 84 is heated so that the liquid 8 flowing through the flow passage 90 is converted from its liquid state into the gaseous state and the resultant gas 19 is able to flow through the bore 94 arranged in the longitudinal direction of the longitudinal central axis 39 of the blow torch 6.

Another difference as compared with the embodiment described with reference to FIGS. 1 to 6 resides in the fact that the evaporator unit 84 is made from a single piece, i.e. the anode 93 is no longer provided as an extra part and instead the entire evaporator unit 84 forms the anode 93, so that the arc 96 can be ignited between the cathode tube 52 and the evaporator unit 84. The arc 96 wanders because of the flow speed of the gas 19 adjacent thereto in the interior of the blow torch 6 after ignition, in the region of the bore 94, so that as the gas 19 leaves the interior of the blow torch 6, the gas 19 is heated and therefore available for a cutting process with the blow torch 6 at any time.

In the embodiment illustrated here, the housing piece 22 is preferably made from a nonconductive material, such as plastics, so that the evaporator unit 84 will be completely insulated from the contact sleeve 52. Furthermore, rather than being provided on the outer periphery of the evaporator unit 84, the heating element 99 is mounted directly in the insulating tube 65 generating heat for the liquid 8 as the liquid 8 flows past. The advantage of this is that it produces a more efficient transfer of heat from the heating element 99 to the liquid 8 so that the liquid 8 is evaporated more rapidly.

Clearly, instead of having to be deliver the liquid 8 via the supply line 7, the liquid 8 could be diverted from the cooling circuit 11 by means of bores running transversely to the longitudinal central axis 39, as illustrated in FIG. 6.

Figure 8:
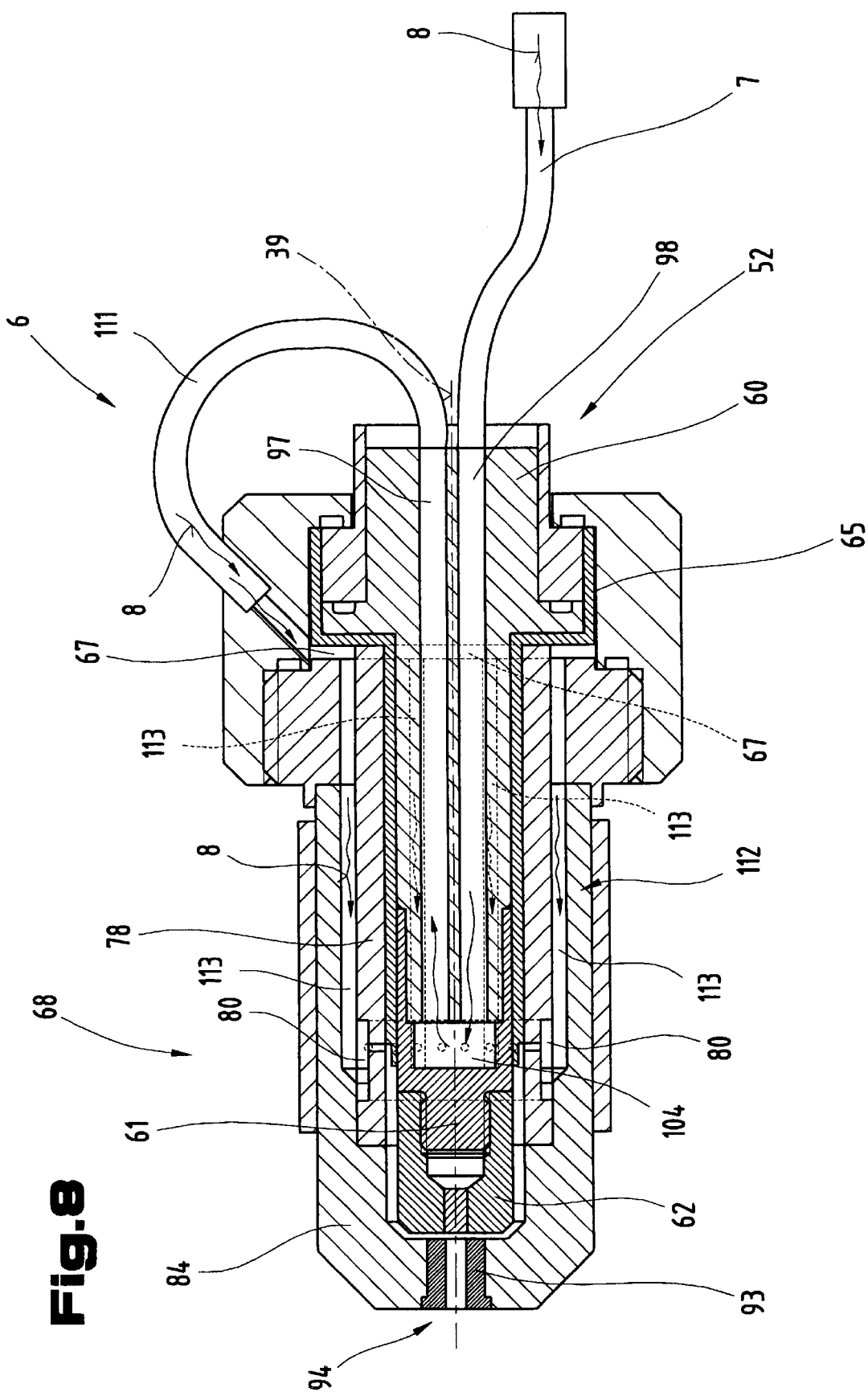
FIG. 8 is a simplified, schematic illustration of another embodiment of the blow torch proposed by the invention, seen in section from a side view.

FIG. 8 illustrates a different embodiment of the blow torch 6 for a steam cutting process. The embodiment illustrated corresponds to the structure as illustrated in FIGS. 2 to 6, although any other design may be used for the blow torch 6.

Details of how the blow torch 6 is operated and the liquid 8 delivered can be found in the description given above of the other drawings.

The difference of this embodiment from those illustrated in the other drawings is that the blow torch 6 does not have its own cooling circuit and instead, the liquid 8 is delivered via the supply line 7 to the blow torch 6 and heat is dispersed by the outflow of gas 19 from the blow torch 6 due to the delivered quantity of liquid 8 and the gas 19, i.e. the heat energy transmitted to the components arranged on the blow torch 6, in particular the anode 93 and the cathode 100, by the arc 96 is fed away by the working medium, in particular the liquid 8, the transmitted heat being dispersed by heating the gas 19 or the liquid 8.

This being the case, the blow torch 6 is designed with bores 97, 98 in the cathode tube 52, the supply line 7 being directly connected to the bore 98 so that as the liquid 8 is delivered to the bore 98, the liquid 8 can flow into the intermediate cavity 104 via the bore 98. From there, the liquid 8 flows across the other bore 97 through the cathode tube 52 in the opposite direction, and, on leaving the bore 97 is delivered or conveyed through an additional line 111 to the bore 35 or 36. The liquid 8 is then compressed into the passage 67 distributing the liquid 8 in the passage 67, thereby causing the liquid 8 to flow on into the end region 68 of the blow torch 6 via flow passages 112 of a predetermined cross section.

The advantage of delivering the liquid 8 in this way is that the liquid 8 is pre-heated as it flows through the cathode tube 52 so that less energy has to be applied to the liquid 8 in order to evaporate the liquid 8 as it continues on into the flow passages 112, the liquid 8 being converted from its liquid state into the gaseous state. The flow through the cathode tube 52 simultaneously means that the cathode tube 52 is also cooled by the liquid 8, thereby preventing the blow torch 6 from overheating.

In the embodiment illustrated here, the flow passages 112 are not provided in the form of threads 75, 88 as was the case in the embodiment described above and instead, longitudinal grooves 113 are provided in the evaporator unit 84, in particular in the bore 86. The individual longitudinal grooves 113 have an appropriate cross section and are arranged distributed about the periphery in the bore 86 of the evaporator unit 84. Because of the layout of the longitudinal grooves 113, the liquid 8 is able to flow through the passage 67 into the individual longitudinal grooves 113 distributed around the periphery of the bore 86 so that the liquid 8 is guided in a predetermined manner in the direction of the anode 93.

Conversion or transformation of the liquid 8 into the gaseous state, in particular into the gas 19, as well as other control procedures or operating modes of the blow torch 6 can be taken from the description of the other drawings.

Instead of providing longitudinal grooves 113 in the blow torch 6, in particular in the evaporator unit 84, it would obviously also be possible to provide recesses or individual bores and, if bores are used, additional cross-bores can be provided in the direction of the groove 80.

It should be pointed out that the principle of the blow torch 6 proposed by the invention is based on a defined or predetermined routing of the liquid 8 in the interior of the blow torch 6 by different types of ducts or flow passages 112, such as the passage 67, the guide passage 77, the flow passage 99 or the longitudinal grooves 113 as well as other designs of flow passages 112. However, with a blow torch 6 of this design, the liquid 8 must be delivered to the blow torch 6 under pressure, preferably between 3 bar and 6 bar, so that the liquid 8 is forced through the individual passages accordingly. Because the liquid 8 is delivered under pressure, the position of the blow torch 6 is irrelevant, i.e. liquid 8 will be supplied whether working with the blow torch 6 overhead or in any other position without being affected by the gravitational force of the earth so that the user always has a ready supply of gas 19 for a cutting process.

Clearly, other methods known from the prior art could be used to ignite the arc 96 in the embodiments illustrated in the drawings. For example, the components could be preheated or the liquid 8 vaporised by means of a pilot arc. Alternatively, the cathode tube 52 and the cathode 100 could also be arranged so that they can be displaced inside the blow torch 6 so that the user could simply push the cathode tube 52 onto the anode 93 to produce a short circuit so that the arc 96 would be struck or ignited as the cathode 100 were then moved back.

With the blow torches 6 described above, a part of the energy flow may be guided across the workpiece 20, i.e. as illustrated by broken lines in FIG. 1, the workpiece 20 could be connected to a line 9, 10, in particular the line 10, so that a corresponding potential could be applied to the workpiece 20 from the power source, thereby enabling another arc 96 to be ignited between the cathode 100 and the workpiece 20. To this end, the arc 96 may be formed in the interior of the blow torch 6 and in addition, as the gas 19 flows out, the other arc 96 will ignite between the workpiece 20 and the cathode 100 so that the gas 19 can be further heated and the temperature of the gas 19 maintained.

However, for this purpose, a higher potential must be applied to the workpiece 20 than to the evaporator unit 84 in order to ignite the arc 96, i.e. the positive potential will be applied to the workpiece 20, for example, so that by using the anode with the positive potential and simultaneously using the cathode tube 52 with the negative potential, the arc 96 will be ignited between the cathode tube 52 and the anode 93, in particular the evaporator unit 84 and, in addition, another arc 96 can be struck or ignited between the cathode tube 52 and the workpiece 20 via the bore 94.

In the case of the embodiments described above, instead of providing the anode 93 on the evaporator unit 84, the cathode 100 could be formed by the evaporator unit 84, in which case the anode 93 would be formed by the cathode tube 52, i.e. the potential could be switched between the two components, in particular the evaporator unit 84 and the cathode tube 52.

In the embodiments illustrated in FIGS. 1 to 8 described above, instead of using the heating element 99, 103 to vaporise the liquid 8, another method could be used to heat the liquid 8. For example, the liquid 8 could be heated and the liquid 8 vaporised by transforming the alternating current through the liquid 8.

Furthermore, it would also be possible to ignite the arc 96 without evaporating the liquid 8 beforehand. To this end, the energy supply for the blow torch 6 may be overlaid with a high-frequency signal. However, in order to be able to ignite the arc 96 if liquid 8 is located between the anode 93 and the cathode 100, the energy must be increased whilst the arc 96 is being ignited. By increasing the energy at the blow torch 6, the liquid 8 located between the anode 93 and the cathode 100 is pressed outwards through the bore 94 by the current flow across the liquid 8 and hence by the resultant heat so that the liquid 8 is heated by the higher amount of energy delivered and is then transformed into the gaseous state, enabling the arc 96 to be automatically ignited. If using an ignition method of this type, however, a certain startup time is needed in order to stabilise the arc 96 or push the liquid 8 out through the bore 94. Once the arc 96 has ignited or stabilised, the energy supplying the blow torch 6 can be reduced since the arc 96 will merely have to be maintained between the cathode 100 and the anode 93 at this stage.

With regard to the different blow torches 6 proposed by the invention, it should be pointed out in principle that the blow torch 6 is connected to a liquid supply system, in particular the container or a water line, by means of a supply line 7 and that at least one duct or flow passage 112 having a predeterminable cross section and path is provided in the blow torch 6 for the liquid 8 and designed so as to convert the liquid 8 into the gaseous state, in particular into the gas 19, and can be connected to the intermediate cavity 83 between cathode 100 and anode 93 by means of a line. The liquid supply system is a container 5 which holds the liquid 8 or a delivery line for the compressed liquid 8.

The liquid supply system and/or the container 5 for the liquid 8 is provided in the supply unit 1. A length of the duct or flow passage 112 or a surface area thereof is so dimensioned that when a predeterminable amount of heat is applied by means of the heating elements 99, 103, the heat energy supplied is sufficient to evaporate the liquid 8 delivered in full. The heating element 99, 103 may be designed so that it extends through the evaporator unit 84, which runs from the intermediate cavity 83 between the cathode 100 and anode 93 as far as the region of the duct or flow passage 112. The heating element 99 is provided in the form of resistor heating elements, heat fuses, radiators or similar.

The evaporator unit 84 forms at least a part of the surface of the duct or flow passage 112. It would also be possible to design the cathode tube 52 so as to form a circulation passage, e.g. bores, which extend in the longitudinal direction of the blow torch 6 so that an outlet of the circulation passage is connected to the duct or flow passage 112 or the intermediate cavity 83 between the cathode 100 and the anode 93.

The duct or flow passage 112 runs around a longitudinal central axis 39 of the blow torch 6, e.g. in a screw arrangement. Furthermore the duct or flow passage 112 may be arranged so as to extend parallel with the longitudinal central axis 39 of the blow torch 6, in which case the duct or flow passage 112 may have a differing or preferably constantly tapering cross section across its length.

The liquid 8 or the liquid 8 transformed into the gaseous state is delivered under pressure to the blow torch 6 or the intermediate cavity 83 between anode 93 and cathode 100. The liquid 8 is heated in the flow passage 90, transforming it from its liquid state into a gaseous state, in particular into the gas 19. To this end, the length of the duct or flow passage 112 is longer than the length needed to convert the liquid 8 into the gaseous state depending on the heat energy delivered to ensure that the liquid 8 is in effect converted into a gas 19.

The quantity of liquid 8 delivered can be regulated so that the transfer of heat to the components of the blow torch 6 by the arc 96 is used to convert the liquid 8 into the gaseous state.

It would also be possible to convert the liquid 8 into a gaseous state externally to the blow torch 6, in which case the gas 19, in particular the water vapour, would be delivered to the intermediate cavity 83 between anode 93 and cathode 100 via the supply line 7, the gas 19 being additional heated by the arc 96.

The arc 96 could also be set up between an anode 93 and a cathode 100 in the blow torch 6 and the cathode 100 in the blow torch 6 and a workpiece 20, in which case the workpiece 20 would be placed ta a higher positive potential than the anode 93 in the blow torch 6.

Figure 9:
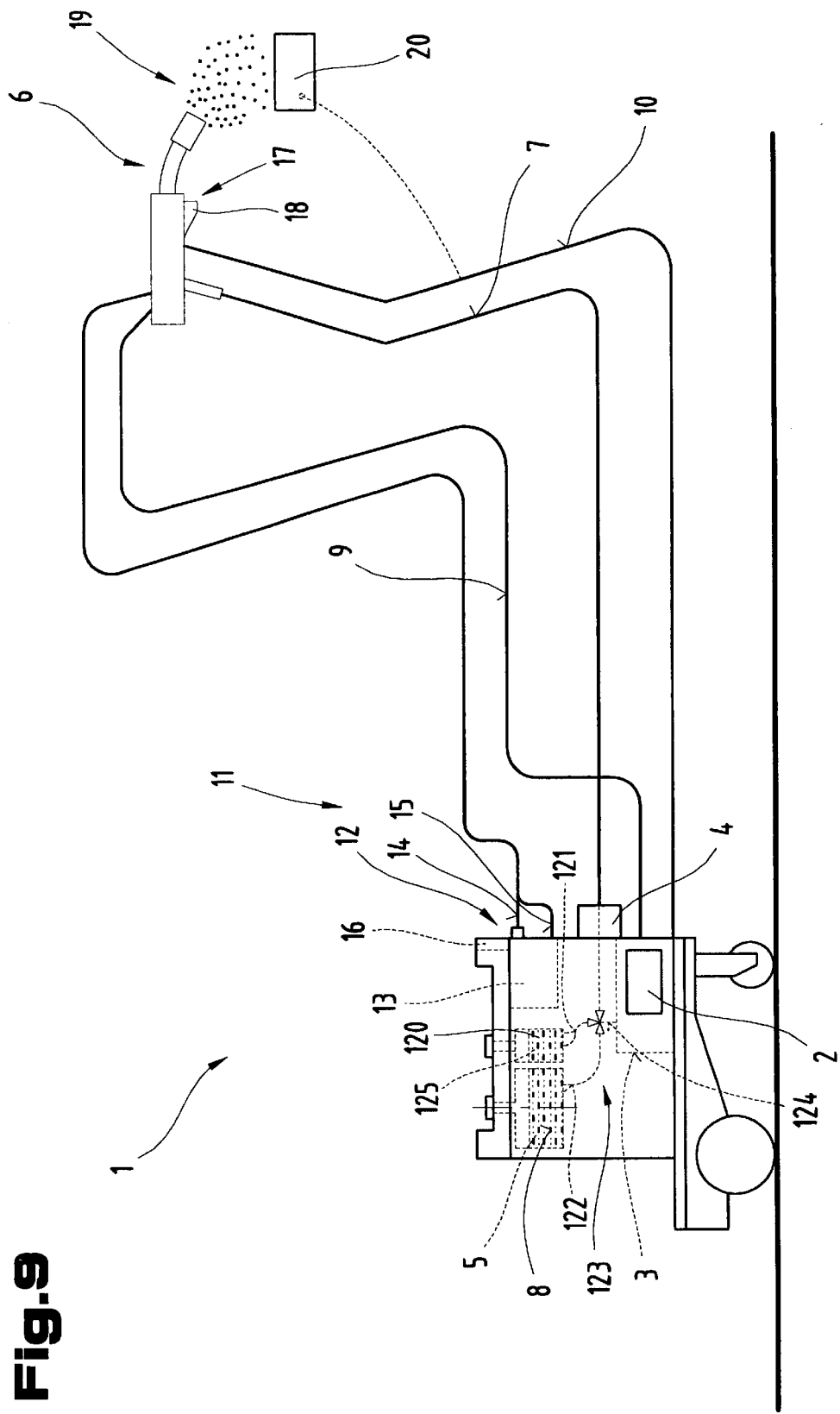
FIG. 9 is a simplified, schematic diagram showing the schematic structure of a steam cutting device.
Figure 10:
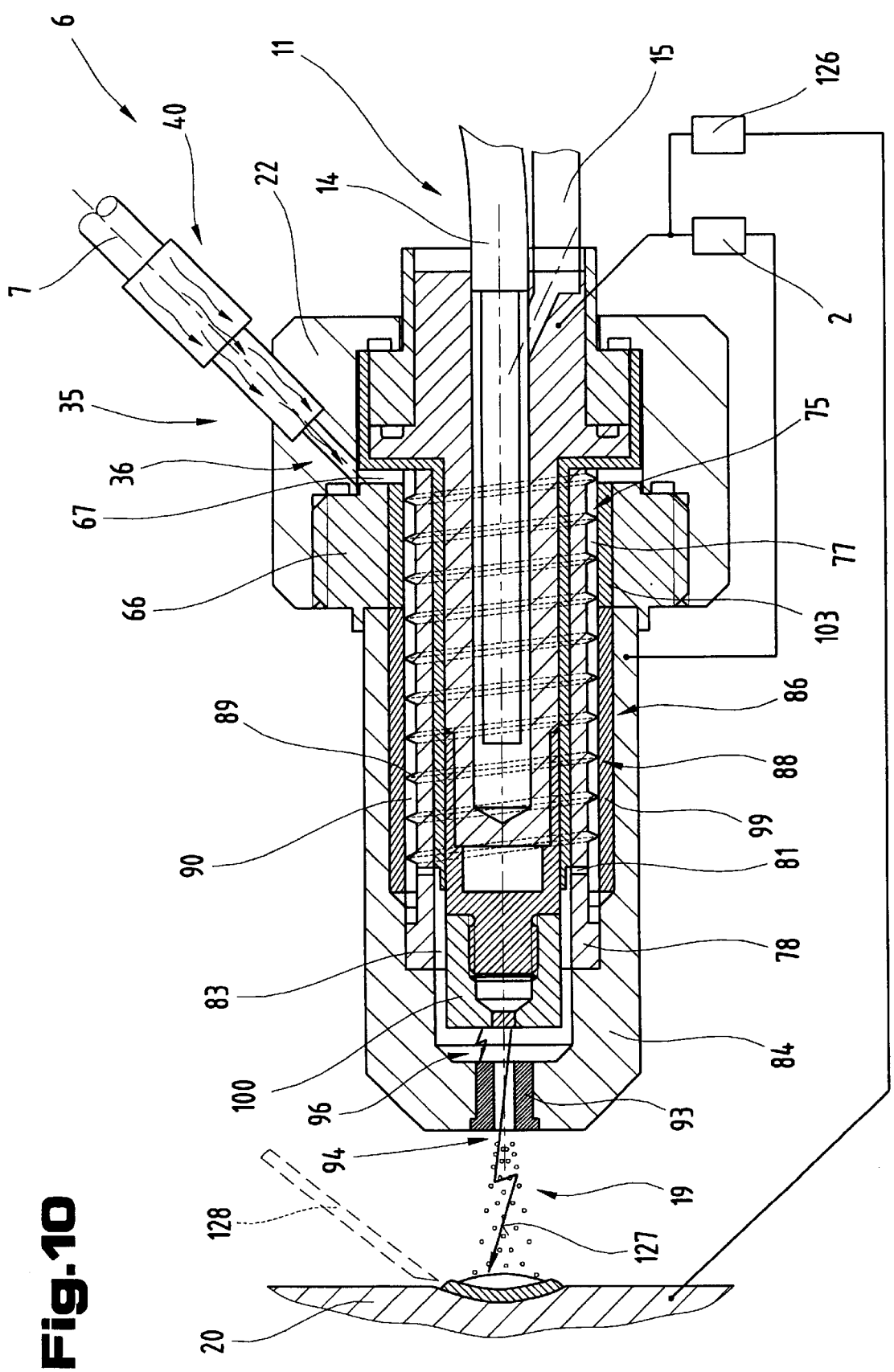
FIG. 10 is a simplified, schematic illustration of another embodiment of the blow torch proposed by the invention, seen in section from a side view.

FIGS. 9 and 10 provide a schematic illustration of the structure of a steam cutting and/or welding device, with an embodiment of an appropriate blow torch 6, the same reference numbers being used to denote the same components as those illustrated in the drawings described above.

The structure of a cutting and/or welding device illustrated schematically in FIG. 9 corresponds to the schematic structure as illustrated in FIG. 1. The individual embodiments of the different blow torches 6 described with reference to FIGS. 1 to 8 may be used for this design. However, if the supply unit 1 is to be used both for a cutting tool and a welding tool, it is recommended that the blow torch 6 illustrated and described with reference to FIG. 10 be used.

The difference as compared with the structure schematically illustrated in FIG. 1 resides in the fact that at least two different liquid supply systems and/or containers 5 and 120 are provided in the supply unit 1, separately from one another. As a result, different liquids 8 can be stored in the individual containers 5 and 120, i.e. water may be stored as the liquid 8 in the container 5 whilst the other container 120 may be used to hold inorganic or organic solvents, for example, or chemical additives.

The individual containers 5, 120 or the liquid supply systems used are then connected via lines 121, 122 to an intermediate circuit of a mixing system, in particular by means of a mixing valve. An outlet of the mixing valve 123 is connected to the blow torch 6 or the connecting piece 40 of the blow torch 6. Clearly, as mentioned in connection with FIGS. 1 to 8 described above, the blow torch 6 may be supplied with liquid 8 via the cooling circuit 11, in which case these containers 5 and 120, in particular the outlet of the mixing valve 123, will be connected to the cooling circuit 11. This ensures that the blow torch 6 will be supplied with a requisite liquid mixture or liquid 8 accordingly and the liquid 8 will be simultaneously used as a coolant.

In order to be able to control the mixing ratio as required via the mixing valve 123, the control device 3 is connected via a control line 124 to a control input of the mixing valve 123. This ensures that by setting an appropriate mixing ratio by means of the input and/or display device 16 from the control device 3, the mixing valve 123 will be controlled accordingly and a predeterminable mixture can be produced from the liquids 8 and 125 held in the containers 5 and 120. As mentioned above, the liquid 8 held in the container 5 may be water whilst a different liquid 125, in particular inorganic or organic solvents or chemical additives can be stored in the other container 120. The method of delivering the liquid mixture from the supply unit 1 to the blow torch 6 can be taken from the description given above in relation to the other drawings, i.e. a pumping device pumps this liquid mixture from the supply unit 1 to the blow torch 6 via the supply line 7, for example, after which the liquid mixture is vaporised or evaporated in the blow torch 6 so that a duly heated gas 19 can be fed out of the blow torch 6.

The advantage of a solution of this type resides in the fact that if the user does not have sufficient advance knowledge of how two liquids 8, 125 are to be mixed, he can fill them into the individual containers 5 and 120 independently of one another and then initiate an appropriate predetermined control and regulation procedure so that the separate liquids 8 and 125 will be correctly mixed automatically by the mixing valve 123.

Clearly, the user could also produce the liquid mixture externally to these containers 5, 120 and then fill one container 5 or 120 or both containers 5 and 120 with this liquid mixture, thereby obviating the need to mix the two fluids 8, 125 through the mixing valve 123.

Another significant advantage of this solution is that an appropriate volume may be stored in the containers 5, 120 of the supply unit 1 to enable the user to apply the blow torch 6 for a relatively long cutting time or welding time with the liquids 8, 125. For this purpose, as mentioned above, the supply unit 1 may be directly connected to a liquid supply system, for example a water line and a tank used for the inorganic or organic or chemical liquids 125, so that a virtually unlimited welding or cutting time can be achieved.

Another major advantage is that the user has the option of changing the mixing ratio at any time, so that the most varied of cutting and/or welding processes can be readily adapted to cater for workpieces 20 made from the most varied of materials. In the systems known from the prior art, a container 5 is provided directly on the blow torch 6 which means that in order to change the mixing ratio, the user has to remove the liquid mixture in the container 5 and replace it with a fresh liquid mixture or can change the liquid mixture by delivering new liquid 8, 125. By providing containers 5, 120, the size of the blow torch can also be kept more compact, thereby making the blow torch 6 more flexible and user friendly.

Clearly it would be possible to provide additional containers 5, 120 in the supply unit 1. These additional containers 5, 120 would then have to be connected in turn via lines 121, 122 to an appropriate mixing valve 123 or be brought together via several mixing valves 123 into a single supply system, in particular the supply line 7. This advantageously enables any application and/or any mixture of different liquids 8, 125 to be used, since the additional containers 5, 120 merely have to be added to the supply unit 1 for use of several different liquids 8, 125.

FIG. 10 illustrates another embodiment of a blow torch 6, the structure of this blow torch corresponding to the embodiment of the blow torch 6 illustrated in FIG. 5. Clearly, the system used in this blow torch 6, in particular the double arc system, could also be used in any of the other blow torches 6 described above.

This blow torch 6 again comprises the same individual parts as those described above. This blow torch 6 is supplied with energy by at least two independent, galvanically separated power sources 2, 126, i.e. the supply unit 1 contains not just one power source 2 but also has an additional power source 126, which can also be regulated and controlled via the control device 3. These power sources 2, 126 may be set up as an inverter power source of the type known from the prior art, for example. By using several power sources 2, 126, in particular two power sources 2, 126, the blow torch 6 can be supplied from two different, independent power circuits.

As schematically illustrated, the blow torch 6, in particular the cathode 100, is connected to the two power sources 2, 126. However, in order to set up a first power circuit, the first power source 2 is connected to the anode 93 so that an arc can be duly ignited between the cathode 100 and the anode 93. This arc 96 is generated in the interior of the blow torch 6, in particular the intermediate cavity 83, so that, as described above, the gas flow of the arc 96 wanders into the front region of the blow torch 6. Clearly, if the anode 93 were arranged at a different point in the blow torch 6, in the region of the guide passage 77, for example, the arc 96 could be struck at any selected point in the interior of the blow torch 6. This being the case, care would merely need to be taken to ensure that the anodes 93 are insulated from the other current-carrying parts to prevent any bridging by the arc 96.

The other power source 126 is then connected on the one hand to the cathode 100 of the blow torch 6 and on the other hand to the workpiece 20. As a result, a potential difference is built up between the blow torch 6 and the workpiece 20 so that an ignition process can be operated, as described above, to form another arc 127 between the workpiece 20 and the cathode 100. The effect of this is that by connecting the workpiece 20 to the power source 126, the arc 127 is formed from the interior of the blow torch 6, in other words from the cathode 100, through the bore 94 onto the workpiece 20. A directly acting arc 127 is therefore generated and this blow torch 6 can then be used to perform both a cutting process and a welding process. In order to perform a welding process, the user merely has to feed an additional substance or additional material, in particular a welding wire 128, into the region of the externally acting arc 127.

An advantage of using two independent power sources 2, 126 is that the quantity of energy for the individual arcs 96, 127 can be applied independently. With a blow torch 6 of this design having two arcs 96, 127, warming or heating of the gas converted in the blow torch 6 is enhanced. Clearly, with a blow torch 6 of this design, the individual arcs 96, 127 may be set up or struck independently of one another, i.e. the blow torch 6 could be operated with the externally acting arc 127 without igniting the optional arc 96 in the interior of the blow torch 6. It would also be possible to generate as many arcs 96, 127 as required although care needs to be taken to ensure that the individual power circuits for the individual arcs 96, 127 are isolated from one another so as to enable independent control.

For the sake of good order, it should be pointed out that in order to provide a clearer understanding of the structure of the blow torch, some of the elements have been partially illustrated out of scale and/or on an enlarged and/or reduced scale.

The independent solutions proposed as a means of resolving the task of the invention may be taken from the description.

Above all, the individual embodiments illustrated in FIGS. 1; 2, 3, 4; 5; 6; 7; 8; 9; 10 may be regarded as independent solutions proposed by the invention in their own right. The tasks and solutions set and proposed by the invention are set out in the detailed descriptions of these drawings.

List of Reference Numbers

1 Supply unit
2 Power source
3 Control device
4 Closure member
5 Container
6 Blow torch
7 Supply line
8 Liquid
9 Line
10 Line
11 Cooling circuit
12 Flow indicator
13 Liquid container
14 Coolant line 15 Coolant line
16 Input and/or display device
17 Operating element
18 Button
19 Gas
20 Workpiece
21 Protective housing
22 Housing piece
23 Bore
24 Bore
25 Bore
26 Diameter
27 Diameter
28 Diameter
29 End face
30 Sealing groove
31 Seal
32 End face
33 Sealing groove
34 Seal
35 Bore
36 Bore
37 Middle axis
38 Angle
39 Longitudinal central axis
40 Connecting piece
41 Diameter
42 Diameter
43 Insulating element
44 Bore
45 Diameter
46 External diameter
47 External diameter
48 End face
49 Length
50 Length
51 Length
52 Cathode tube
53 External diameter
54 Projection
55 External diameter
56 External surface
57 End face
58 Sealing groove
59 Seal
60 Part
61 Part
62 Part
63 Longitudinal region
64 External diameter
65 Insulating tube
66 Bridging piece
67 Passage
68 End region
69 External diameter
70 Projection
71 Projection
72 Bore
73 Diameter
74 External diameter
65 Thread
76 Threads
77 Guide passage
78 Sleeve
79
80 Groove
81 Bore
82 Bore
83 Intermediate cavity
84 Evaporator unit
85 Length
86 Bore
87 Diameter
88 Thread
89 Threads
90 Flow passage
91 Bore
92 Diameter
93 Anode
94 Bore
95 Diameter
96 Arc
97 Bore
98 Bore
99 Heating element
100 Cathode
101
102
103 Heating element
104 Intermediate cavity
105 Bore
106
107
108 Projection
109 Bore
110 Bore
111 Additional line
112 Flow passage
113 Longitudinal grove
114
115
116
117
118
119
120 Container
121 Line
122 Line
123 Mixing valve
124 Control line
125 Liquid
126 Power source 127 Arc
128 Welding wire

What is claimed is:

1. A blow torch for cutting a workpiece, which comprises
   (a) a liquid supply system connected to the blow torch by a liquid supply line,
   (b) a cathode,
   (c) an anode,
      (1) an intermediate cavity being provided between an end of the cathode and the anode,
   (d) a flow passage surrounding the cathode and having one end arranged to receive liquid from the liquid supply line and an opposite end leading to the intermediate cavity, and
   (e) a heating element mounted on the blow torch and controlled to deliver a predetermined amount of heat,
      (1) the flow passage having a predetermined cross section and being so dimensioned that the predetermined amount of heat completely evaporates the liquid and converts the liquid to a gaseous state in the intermediate cavity.

2. The blow torch of claim 1, wherein the heating element is a resistance heater, a heat fuse or a radiator.

3. The blow torch of claim 1, wherein the heating element extends from the intermediate cavity to at least a portion of the flow passage.

4. The blow torch of claim 1, wherein the liquid supply system comprises a container holding the liquid and means for supplying the liquid to the liquid supply line under pressure.

5. The blow torch of claim 1, wherein the cathode comprises a cathode tube defining longitudinally extending bores in communication with the flow passage or the intermediate cavity.

6. The blow torch of claim 1, wherein the flow passage has the shape of a screw extending coaxially about a longitudinal center axis of the blow torch.

7. The blow torch of claim 1, wherein the flow passage runs parallel to a longitudinal center axis of the blow torch.

8. The blow torch of claim 1, further comprising a high-frequency generator connected to the blow torch for igniting an arc between the cathode and the anode.

9. The blow torch of claim 1, comprising an assembly of a housing piece and a bridging piece in the housing piece holding a cathode tube forming part of the cathode, an insulating element surrounding an upper end of the cathode tube, an insulating tube extending from the insulating element to a lower part of the cathode tube, a sleeve extending between the insulating tube and the bridging piece and extending to the lower cathode tube part, and an evaporator unit holding the heating element and surrounding the sleeve.

10. The blow torch of claim 9, wherein the sleeve has a threaded external surface and the evaporator unit has an axial bore holding the heating element, the heating element surrounding the threaded external sleeve surface and defining the flow passage therewith.

11. The blow torch of claim 9, wherein the bridging piece is threadedly connected to the housing piece, and the evaporator unit is threadedly connected to the bridging piece.

12. The blow torch of claim 9, wherein the bridging piece and the evaporator unit have coaxial bores with inner threaded surfaces defining the flow passage.

13. The blow torch of claim 12, wherein the threaded surfaces have a pitch of 1 mm to 6 mm.

14. The blow torch of claim 12, wherein the heating element is coextensive with the threaded surface of the evaporator unit and the intermediate cavity.

15. The blow torch of claim 9, wherein the heating element is arranged on an external surface of the evaporator unit.

16. The blow torch of claim 9, wherein the evaporator unit has a bore in communication with the intermediate cavity, and the anode is inserted in the evaporator unit bore.

17. The blow torch of claim 16, wherein the anode has a bore extending coaxially along a central axis of the blow torch, permitting the liquid converted to the gaseous state in the intermediate cavity to escape.

18. The blow torch of claim 1, wherein the cathode is assembled of interconnected components of different electrically conductive materials.

19. The blow torch of claim 1, wherein the liquid supply system comprises a source of a coolant fluid, and the cathode comprises a cathode tube defining longitudinally extending bores connected to the coolant fluid source for circulating the coolant fluid therethrough.

20. The blow torch of claim 19, wherein the longitudinally extending bore are in communication with each other through a cavity at inner ends of the bores.

21. The blow torch of claim 19, wherein the cathode tube has radially extending bores connecting the longitudinally extending bores to the flow passage.

22. The blow torch of claim 1, wherein the cathode comprises a cathode tube, further comprising a housing piece having a bore holding the cathode tube, and insulating element and insulating tube surrounding the cathode tube and insulating the same from the housing piece.

23. The blow torch of claim 22, further comprising a sleeve coaxially surrounding the insulating tube, the flow passage extending along the sleeve.

24. The blow torch of claim 23, wherein an end of the sleeve has a circumferential groove and radial bores connecting the flow passage to the intermediate cavity.

25. The blow torch of claim 1, further comprising a housing piece having an axial bore section holding the cathode, and the housing piece having a bore connecting the liquid supply line to the flow passage.

26. The blow torch of claim 25, further comprising a bridging piece arranged in a further axial bore section of the housing piece, an insulating tube extending between the cathode and the axial bore sections of the housing piece and the bridging piece, and a passage between the housing pieace and the bridging piece connects the bore in the housing piece to the flow passage.

27. The blow torch of claim 1, further comprising an electrically non-conductive housing covering the blow torch.

28. The blow torch of claim 1, wherein the liquid supply system comprises at least two containers holding different liquids.

29. The blow torch of claim 28, further comprising a mixing valve interconnecting the containers.

30. The blow torch of claim 29, wherein the mixing valve has an outlet connecting the blow torch to the liquid supply system.

31. A method of cutting a workpiece with a blow torch comprising a cathode and an anode, which comprises the steps of
   (a) supplying a liquid under pressure to a flow passage surrounding the cathode and having one end arranged to receive the liquid from a liquid supply line and an opposite end leading to an intermediate cavity provided between an end of the cathode and the anode,
   (b) heating the liquid flowing through the flow passage while controlling the heating to deliver a predetermined amount of heat and controlling the quantity of liquid so that the predetermined amount of heat completely evaporates the liquid and converts the liquid to a gaseous state in the intermediate cavity, and (c) igniting an arc between the anode and cathode.

32. The method of claim 31, wherein the flow passage is longer than the intermediate cavity.

33. The method of claim 31, wherein the arc is ignited after the liquid has been converted to a gaseous state.

34. The method of claim 31, wherein a high-frequency signal ignites the arc.

35. The method of claim 31, wherein the liquid is conveyed through the flow passage in a helical path winding around the cathode coaxially with a longitudinal axis of the blow torch.

36. The method of claim 31, comprising the further step of striking an arc between the cathode and the workpiece, the workpiece having a higher positive potential than the anode.

* * * * *

UNITED STATES PATENT AND TRADEMARK OFFICE
CERTIFICATE OF CORRECTION

PATENT NO.    : 6,326,581 B1
DATED         : December 4, 2001
INVENTOR(S)   : Laimer et al.

It is certified that error appears in the above-identified patent and that said Letters Patent is hereby corrected as shown below:

<u>Title page,</u>
Item [30], the priority number correctly should read: -- 113/98 --.

Signed and Sealed this

Twenty-second Day of October, 2002

Attest:

Attesting Officer

JAMES E. ROGAN
*Director of the United States Patent and Trademark Office*